(12) United States Patent
Patrick et al.

(10) Patent No.: US 11,613,088 B2
(45) Date of Patent: Mar. 28, 2023

(54) SELF-HEALING INTERLAMINAR DELAMINATION IN FIBER-REINFORCED COMPOSITES VIA THERMAL REMENDING

(71) Applicant: North Carolina State University, Raleigh, NC (US)

(72) Inventors: Jason Patrick, Raleigh, NC (US); Alexander Snyder, Raleigh, NC (US)

(73) Assignee: NORTH CAROLINA STATE UNIVERSITY, Raleigh, NC (US)

( * ) Notice: Subject to any disclaimer, the term of this patent is extended or adjusted under 35 U.S.C. 154(b) by 245 days.

(21) Appl. No.: 16/944,675

(22) Filed: Jul. 31, 2020

(65) Prior Publication Data
US 2021/0031470 A1    Feb. 4, 2021

Related U.S. Application Data

(60) Provisional application No. 62/881,167, filed on Jul. 31, 2019.

(51) Int. Cl.
B29C 73/18    (2006.01)
B32B 27/18    (2006.01)
(Continued)

(52) U.S. Cl.
CPC ............. B29C 73/18 (2013.01); B32B 27/18 (2013.01); B32B 27/286 (2013.01);
(Continued)

(58) Field of Classification Search
None
See application file for complete search history.

(56) References Cited

FOREIGN PATENT DOCUMENTS

WO    2010144971 A1    12/2010

OTHER PUBLICATIONS

Ramakrishan et al., Journal of Manufacturing Science and Engineering, vol. 122, pp. 124-131 (Year: 2000).*

(Continued)

*Primary Examiner* — Ramsey Zacharia
(74) *Attorney, Agent, or Firm* — Thomas | Horstemeyer, LLP

(57) ABSTRACT

Disclosed herein is an intrinsically self-healing composite based upon in situ thermal remendability of an embedded polymeric interphase. The fiber-reinforced composite (FRC) material may incorporate a thermoset polymer with a defined glass transition temperature ($T_g$) and/or a thermoplastic material of amorphous or semi-crystalline nature. The polymeric interphase can be incorporated as a plurality of particles, fibers, meshes, films, or 3D-printed structures. The self-healing composite includes a resistive heating component as a structural element that minimizes electrical energy demand and impact on mechanical integrity. Healing occurs in situ via resistive heating and can be enabled below, at, or above the glass-transition temperature of the FRC matrix, demonstrating viability for in-service repair under sustained loads. In addition to providing rapid healing functionality, the polymeric interphase increases inherent resistance to interlaminar fracture. Repeated heal cycles have been achieved in a double cantilever beam (DCB) fracture test without significant degradation in performance.

15 Claims, 17 Drawing Sheets

(51) Int. Cl.
- B32B 27/28 (2006.01)
- B32B 27/36 (2006.01)
- B32B 27/38 (2006.01)
- B32B 43/00 (2006.01)
- C08J 5/04 (2006.01)

(52) U.S. Cl.
CPC ............ *B32B 27/288* (2013.01); *B32B 27/36* (2013.01); *B32B 27/38* (2013.01); *B32B 43/00* (2013.01); *C08J 5/042* (2013.01); *C08J 5/043* (2013.01); *B32B 2305/08* (2013.01); *B32B 2305/345* (2013.01); *B32B 2307/762* (2013.01)

(56) References Cited

OTHER PUBLICATIONS

Chowdhury et al.. Self-healing epoxy composites: preparation, characterization and healing performance, J Mater Res Technol, 4(1):3343, 2015.
Kwok et al., Resistance Heating for Self-healing Composites, Journal of Composite Materials, vol. 41, No. 13, 1635-1654, 2007.
Imato et al., Self-Healing of Chemical Gels Cross-Linked by Diarylbibenzofuranone-Based Trigger-Free Dynamic Covalent Bonds at Room Temperature, Angew. Chem. Int. Ed., 51, 1138-1142, 2012.
Standard Test Method for Tensile Properties of Polymer Matrix Composite Materials, Designation: D 3039/D 3039M-08, ASTM International, 2012.
Yang et al., Mechanical Properties of Self-healing Carbon Fiber-Epoxy Composite Stitched with Mendable Polymer Fiber, Polymers & Polymer Composites, vol. 22, No. 3, 329-335, 2014.
Standard Test Method for Assignment of the Glass Transition Temperature By Dynamic Mechanical Analysis, Designation: E1640-13, ASTM International, 2020.
Patel et al., Autonomic healing of low-velocity impact damage in fiber-reinforced composites, Composites: Part A 41 (2010) 360-368.
Pestka et al., Elastic evolution of a self-healing ionomer observed via acoustic and ultrasonic resonant spectroscopy, Scientific Reports, 7:14417, 1-7, 2017.
Leeuwenburgh et al., Self-Healing Materials are Coming of AgeAdvanced Materials Interfaces, vol. 5, No. 17, 2018.
Kalista et al., Effect of ionic content on ballistic self-healing in EMAA copolymers and ionomers, Polym. Chem., 2013, 4, 4910-4926.
Pingkarawat et al., Poly(ethylene-co-methacrylic acid) (EMAA) as an efficient healing agent for high performance epoxy networks using diglycidyl ether of bisphenol A (DGEBA), Polymer 92 (2016) 153-163.
Meure et al., Confirmation of the healing mechanism in a mendable EMAA-epoxy resin, European Polymer Journal 48 (2012) 524-531.
Chen et al., A Thermally Re-mendable Cross-Linked Polymeric Material, Science, vol. 295, 1698-1702, 2002.
Patrick et al., Continuous Self-Healing Life Cycle in Vascularized Structural Composites, Adv. Mater. 2014, 26, 4302-4308.
Hashemi et al., Corrections needed in double-cantilever beam tests for assessing the interlaminar failure of fibre-composites, Journal of Materials Science Letters 8 (1989) 125-129.
Park et al., Healing behavior of a matrix crack on a carbon fiber/mendomer composite, Composites Science and Technology 69 (2009) 1082-1087.
Jony et al., Fracture resistance of in-situ healed CFRP composite using thermoplastic healants, Materials Today Communications 24 (2020) 101067.
Varley et al., EMAA as a healing agent for mendable high temperature epoxy amine thermosets, Composites: Part A 43 (2012) 1073-1080.
Krull et al., Automatic Optical Crack Tracking for Double Cantilever Beam Specimens, SEM, p. 1-9, 2015.
Pingkarawat et al., Healing of carbon fibre-epoxy composites using thermoplastic additives, Polym. Chem., 4, 5007-5015, 2013.
Patrick et al., Polymers with autonomous life-cycle control, Nature, vol. 540, 363-370, 2016.
Pingkarawat et al., Self-healing of delamination cracks in mendable epoxy matrix laminates using poly[ethylene-co-methacrylic acid)] thermoplastic, Composites: Part A 43 (2012) 1301-1307.
Blaiszik et al., Self-Healing Polymers and Composites, Annu. Rev. Mater. Res. 2010. 40:179-211.
Standard Test Method for Mode I Interlaminar Fracture Toughness of Unidirectional Fiber-Reinforced Polymer Matrix Composites, Designation: D 5528-01 (Reapproved 2007), ASTM International.
Zhang et al., Toughening mechanism of carbon fibre-reinforced polymer laminates containing inkjet-printed poly(methyl methacrylate) microphases, Journal of Composite Materials 2018, vol. 52(11) 1567-1576.
Park et al., Towards Development of a Self-Healing Composite using a Mendable Polymer and Resistive Heating, Journal of Composite Materials, vol. 42, No. 26, 2869-2881, 2008.
Wang et al., Interlayer self-healing and toughening of carbon fibre/epoxy composites using copolymer films, Composites: Part A 43 (2012) 512-518.
Meure et al., Poly[ethylene-co-(methacrylic acid)] Healing Agents for Mendable Carbon Fiber Laminates, Macromol. Mater. Eng. 2010, 295, 420-424.
Kalista, Self-Healing of Thermoplastic Poly(Ethylene-co-Methacrylic Acid) Copolymers Following Projectile Puncture, Thesis submitted to the faculty of Virginia Polytechnic Institute and State University in partial fulfillment of the requirements for the degree of Master of Science In Engineering Mechanics, Sep. 1, 2003.
Cohades, et al., Progress in self-healing fiber-reinforced polymer composites, Advanced Materials Interfaces, 5, 1800177, 2018.
Esser-Kahn, et al., Three Dimensional Microvascular Fiber-Reinforced Composites, Advanced Materials, 23, 3654-3658, 2011.
Kessler, et al., Damage detection in composite materials using frequency response methods, Composites Part B: Engineering, 33, 87-85, 2002.
Meure, et al., Polyethylene-co-methacrylic acid healing agents for mendable epoxy resins, Acta Materiala, 57, 4312-4320, 2009.
Pingkarawat, et al., Healing of fatigue delamination cracks in carbon-epoxy composite using mendable polymer stitching, Journal of Intelligent Material Systems and Structures, 25, 75-86, 2014.
Pingkarawat, Mechanical properties of mendable composites containing self-healing thermoplastic agents, Composites Part A: Applied Science and Manufacturing, 65, 10-18, 2014.
Withers, et al., Fatigue and Damage in Structural materials Studied by X-Ray Tomography, Annual Review of Materials Research, 42, 81-103, 2012.
White, et al., Delamination toughness of fiber-reinforced composites containing a carbon nanotube/polyamide-12 epoxy thin film interlayer, Polymer, 53, 37-42, 2012.
LaminaHeat PowerFilm Data Sheet, <http://www.tcomposites.com/var/m_6/65/650/37795/413803-LaminaHeat%20PowerFilm%20201503.pdf?download>, accessed Jul. 2019, 2pp.
LaminaHeat PowerFabric Data Sheet, <http://www.tcomposites.com/var/m_6/65/650/37795/413802-LaminaHeat%20PowerFabric%20201503.pdf?download>, accessed Jul. 2019, 2pp.
SEFAR PowerHeat NT—Heating Fabric, <https://www.sefar.us/data/docs/en/10600/SF-PDF-Smart-Fabrics-CI-40-PowerHeat-NT-EN.pdf?v=1.1>, accessed Jul. 2019, 8pp.

* cited by examiner

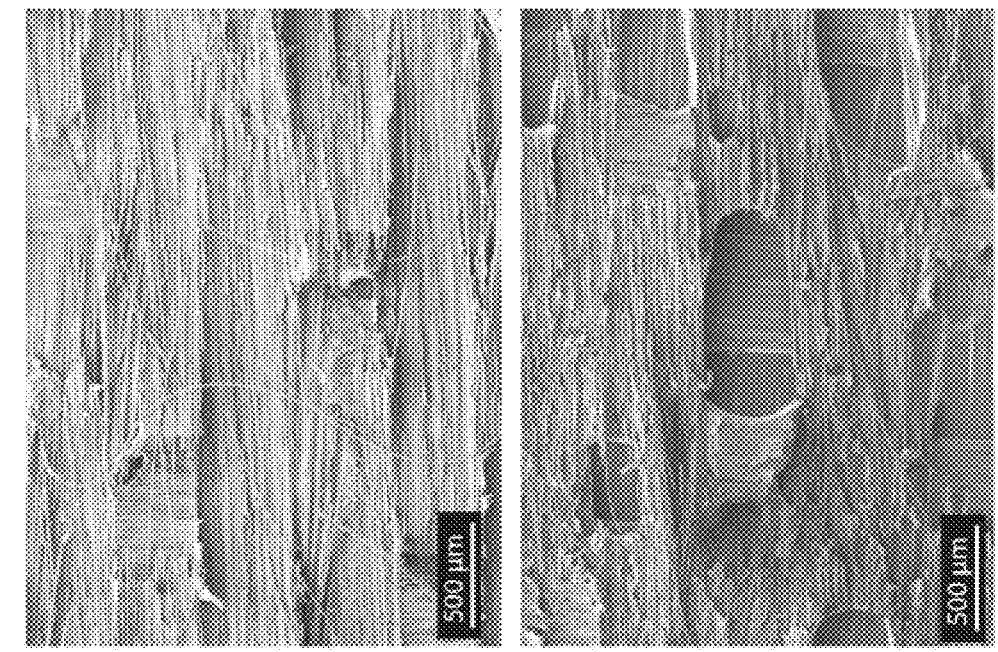
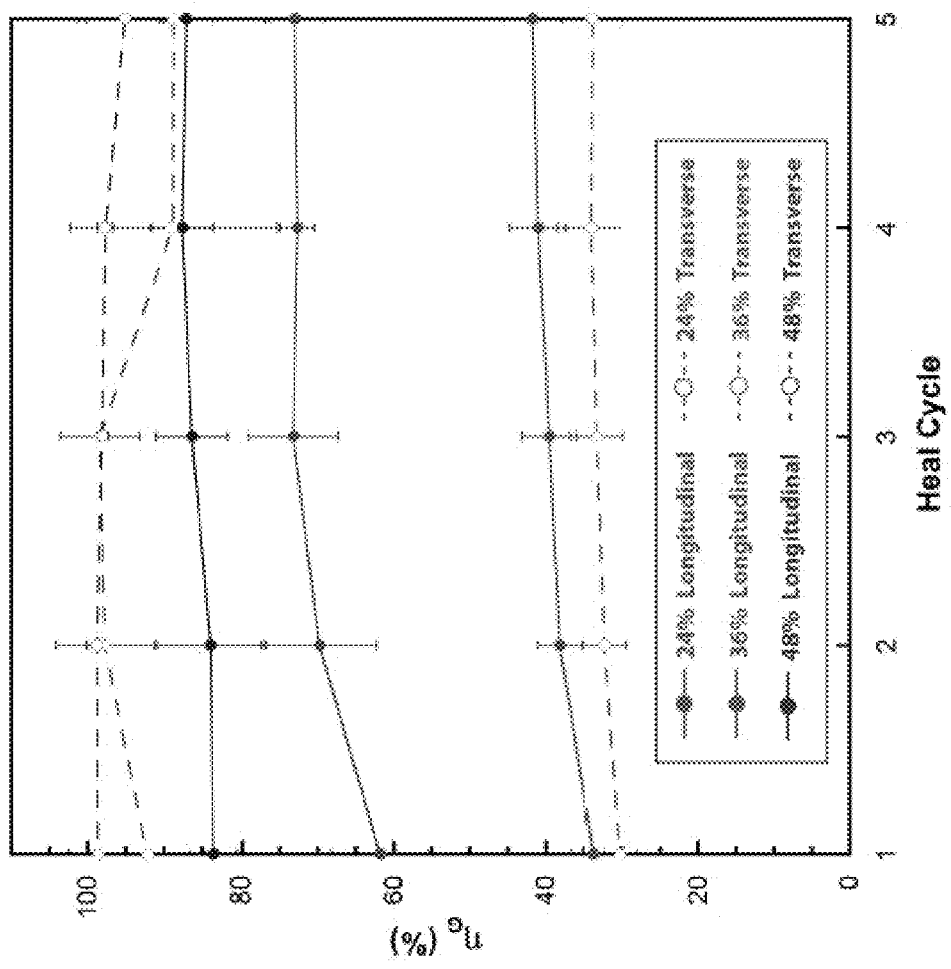
FIGs. 6A-6C

SELF-HEALING INTERLAMINAR DELAMINATION IN FIBER-REINFORCED COMPOSITES VIA THERMAL REMENDING

CROSS-REFERENCE TO RELATED APPLICATIONS

This application claims the benefit of U.S. Provisional Application No. 62/881,167 filed on Jul. 31, 2019.

BACKGROUND

Fiber-reinforced composites (FRC) are lightweight, structural materials useful in a variety of weight-critical industrial applications due to their high-specific strength and stiffness. For example, in aerospace, the Boeing 787 Dreamliner is 50 percent fiber-reinforced composite by weight. Interlaminar delamination in layered composites reduces reliability and leads to overengineering, which can offset any weight advantages of FRC.

Impact, fatigue, and manufacturing defects are common causes of interlaminar delamination in FRC, which initiates at the weaker interface between the matrix and fiber reinforcing layers. Delaminations can span hundreds of microns in the crack opening direction and reach centimeters in length, producing sizeable, yet often undetectable, internal damage zones within the composite structure. Self-healing strategies have emerged to eliminate the need to locate, inspect, and manually repair damage.

Interlaminar delamination damage in FRC, especially common in layered (i.e., laminated) composites, is difficult to detect and nearly impossible to repair by conventional methods. This failure mechanism remains one of the most significant factors limiting reliability of composites for lightweight structures. Self-healing strategies involving sequestration of reactive liquids, i.e., microcapsule and microvascular systems, show promise for extending lifetimes of laminated composites. However, limited heal cycles, long reaction times (hours/days), and stability of chemical agents under a variety of environmental conditions remain challenging. Intrinsic self-healing approaches that take advantage of reversible bonds within the host material circumvent such limitations and offer potential for unlimited heal cycles. Furthermore, microcapsule based self-healing approaches can repair small (micron scale) cracks but do not provide enough liquid healing agent to fill larger delaminations.

Self-healing approaches that rely on synthetic vessels (e.g., capsules) and/or vascular systems to deliver liquid healing agents to fill and repair damaged regions have inherent drawbacks with regards to repeated heal cycles. Sealed vessels can only deliver a finite volume of healing agent, which once depleted, no longer provides recovery. Microvascular systems with external fluid reservoirs or capacity to be refilled can afford multiple heal cycles. However, ruptured vasculature can limit healing agent delivery to the required areas. Redundant, branched vasculature can circumvent vascular damage, although polymerized healing agents can accumulate and, especially with two-part systems, cross-contaminate, eventually blocking the vascular network from further liquid delivery. Difficulties in achieving stoichiometric in situ mixing of two-part agents, reactant stability concerns, and polymerization times on the order of hours/days are additional research challenges that have limited adoption of microvascular technology.

Intrinsic self-healing strategies, based on reassociation of chemical bonds within the host material, circumvent issues exclusive to extrinsic (e.g., capsule/vascular) healing approaches. However, intimate contact of damaged surfaces and adequate energy input are required to overcome the re-bonding potentials. Intrinsic self-healing has provided repeatable recovery of mechanical properties on both soft (gel-like) and hard polymer systems. While re-bonding of fractured interfaces in soft materials is readily achieved at room temperature, healing in more rigid materials often requires the input of external energy. Self-healing studies requiring the input of heat have been accomplished ex situ (e.g., in a laboratory oven) or by heating the materials above the host thermoset glass-transition temperature ($T_g$), where structural properties such as elastic modulus drop significantly. Achieving in situ thermal remending in an FRC below the matrix $T_g$ remains an unmet challenge.

In situ heating to achieve self-healing of matrix microcracks in a carbon-fiber reinforced polymer (CFRP) composite has been demonstrated by resistively heating the embedded graphite reinforcement through formation of external electrical contacts. Thermal remending of micro fractures occurred via Diels-Alder reactions of a mendomer 401 modified thermoset matrix. However, healing was reported at temperatures exceeding $T_g$. More recently, millimeter-scale delaminations have been healed in situ within CFRP laminates using a thermoplastic (polycaprolactone) and shape memory polymer (SMP) modified thermoset epoxy matrix via thermal activation using a surface-mounted MACROFIBERCOMPOSITE™ (MFC) piezoelectric film. A sufficient healing temperature to activate the SMP for assisted crack closure and also melt the thermoplastic phase was generated by the MFC using 100V AC power at a high, square-wave driving frequency of 24 kHz. However, the externally-bonded and localized MFC heating elements were found to be susceptible to damage, including abrasion and corrosion, and environmental stresses.

Despite recent advances in self-healing of fiber-reinforced composite materials, a self-healing composite capable of repeated in situ repair or self-healing of the most common type of damage, i.e., interlaminar delamination, without the associated drawbacks of capsules or vascular systems and/or ex situ heating above material $T_g$, has still not been developed. An ideal system would further include resistive heating components protected from physical damage and environmental stresses in order to extend the lifetime of the composite material. The present disclosure addresses these needs.

SUMMARY

Disclosed herein is an intrinsically self-healing composite based upon in situ thermal remendability of an embedded polymeric interphase. The fiber-reinforced composite (FRC) material may incorporate a thermoset polymer with a defined glass transition temperature ($T_g$) and/or a thermoplastic material of amorphous or semi-crystalline nature. The polymeric interphase can be incorporated as a plurality of particles, fibers, meshes, films, or 3D printed structures. The self-healing composite includes a resistive heating component as a structural element that minimizes electrical energy demand and impact on mechanical integrity. In contrast to prior thermal remending systems, healing occurs in situ via resistive heating and can be enabled below, at, or above the glass-transition temperature of the FRC matrix, demonstrating viability for in-service repair under sustained loads. In addition to providing rapid (minute-scale) healing functionality, the polymeric interphase also increases inherent resistance to interlaminar fracture. Repeated heal cycles have been achieved in a double cantilever beam (DCB) fracture test without significant degradation in performance.

In accordance with the purpose(s) of the present disclosure, as embodied and broadly described herein, the disclosure, in one aspect, relates to self-healing fiber-reinforced composite materials and methods of making the same. The method may be used to produce self-healing composites, composite laminates, or other structures such as, for example, 3D woven materials that comprise a self-healing composite.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims. In addition, all optional and preferred features and modifications of the described embodiments are usable in all aspects of the disclosure taught herein. Furthermore, the individual features of the dependent claims, as well as all optional and preferred features and modifications of the described embodiments are combinable and interchangeable with one another.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 1Ai shows modified FRP laminate with resistive heaters placed symmetrically about mid-ply that is functionalized with 3D printed thermoplastic (i.e., EMAA); FIG. 1Aii shows interlaminar delamination ruptures EMAA and separates mid-layers; FIG. 1Aiii shows resistive (Joule) heating melts thermoplastic domains resulting in bond reassociation and self-repair of internal delamination (i.e., thermal remending).

FIG. 5A shows mode-I fracture resistance ($G_{IC}$) comparison for plain (0%) and patterned composites at varying areal coverages (24, 36, 48%). FIG. 5B shows healing efficiencies ($G_{IC}$) after the first thermal remending cycle. Error bars represent standard deviation from three samples tested for each configuration.

FIG. 6A shows healing efficiencies for each pattern and areal coverage over five heal cycles for all sample types and areal coverages tested. FIG. 6B shows a SEM image of a fracture surface after a virgin test showing EMAA domains and glass fiber bridging. FIG. 6C shows a SEM image of a fracture surface after the $5^{th}$ heal cycle.

Figures 1A, 1B, 1C, 1D:
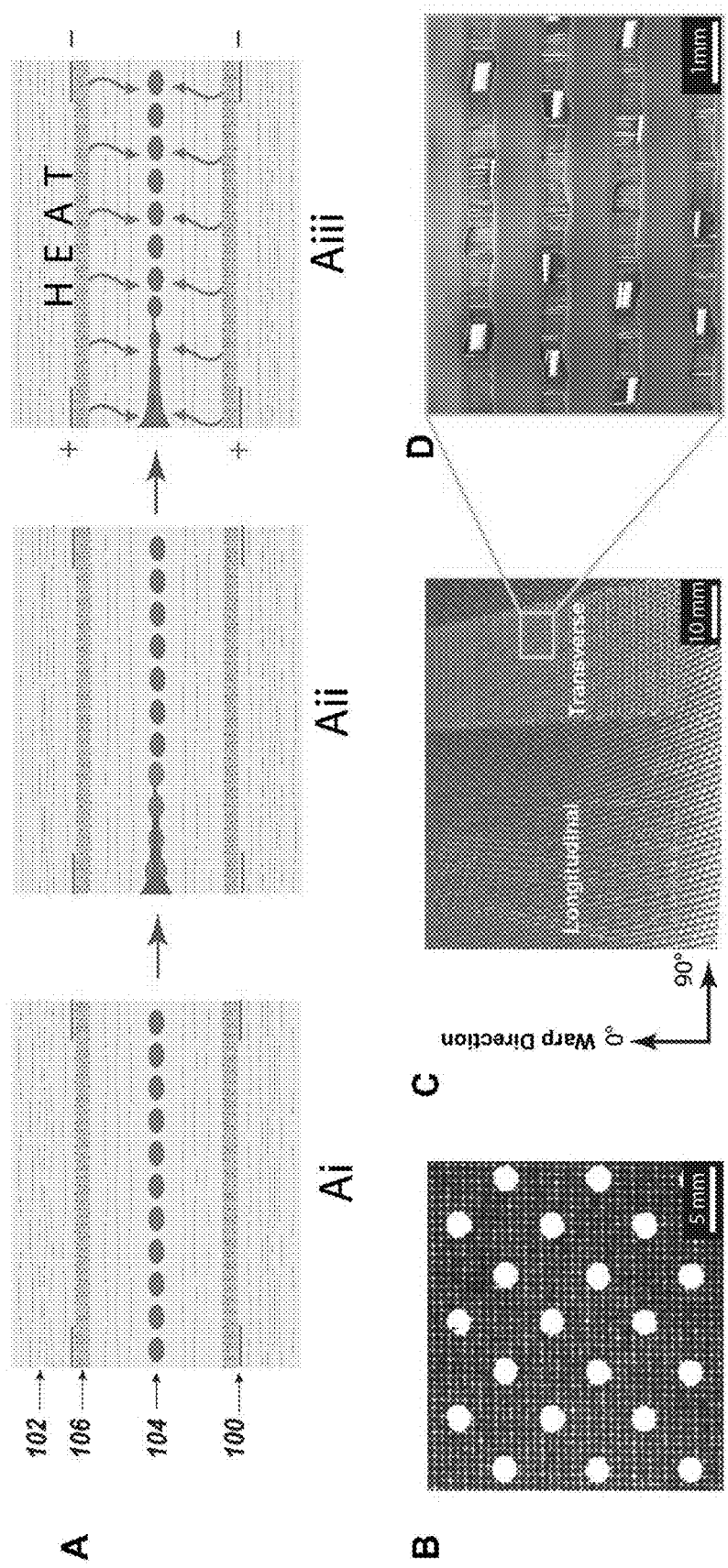
FIG. 1A shows a cross-sectional schematic of one aspect of the disclosed self-healing composites and further illustrates the thermal remending process according to one embodiment of the present disclosure including process stages depicted in FIGS. 1Ai-1Aiii.
FIG. 1B shows an optical image of a perforated resistive heater interlayer.
FIG. 1C shows an optical micrograph of representative, as-printed longitudinal and transverse polyethylene-co-methacrylic acid (EMAA) serpentine patterns on woven E-glass reinforcement.
FIG. 1D shows a scanning electron micrograph (SEM) of printed EMAA on a woven reinforcement.

Additional advantages of the invention will be set forth in part in the description that follows, and in part will be obvious from the description, or can be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

Many modifications and other embodiments disclosed herein will come to mind to one skilled in the art to which the disclosed compositions and methods pertain having the benefit of the teachings presented in the foregoing descriptions and the associated drawings. Therefore, it is to be understood that the disclosures are not to be limited to the specific embodiments disclosed and that modifications and other embodiments are intended to be included within the scope of the appended claims. The skilled artisan will recognize many variants and adaptations of the aspects described herein. These variants and adaptations are intended to be included in the teachings of this disclosure and to be encompassed by the claims herein.

Although specific terms are employed herein, they are used in a generic and descriptive sense only and not for purposes of limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure.

Any recited method can be carried out in the order of events recited or in any other order that is logically possible. That is, unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein can be different from the actual publication dates, which can require independent confirmation.

While aspects of the present disclosure can be described and claimed in a particular statutory class, such as the system statutory class, this is for convenience only and one of skill in the art will understand that each aspect of the present disclosure can be described and claimed in any statutory class.

It is also to be understood that the terminology used herein is for the purpose of describing particular aspects only and is not intended to be limiting. Unless defined otherwise, all technical and scientific terms used herein have the same meaning as commonly understood by one of ordinary skill in the art to which the disclosed compositions and methods belong. It will be further understood that terms, such as those defined in commonly used dictionaries, should be interpreted as having a meaning that is consistent with their meaning in the context of the specification and relevant art and should not be interpreted in an idealized or overly formal sense unless expressly defined herein.

Prior to describing the various aspects of the present disclosure, the following definitions are provided and should be used unless otherwise indicated. Additional terms may be defined elsewhere in the present disclosure.

Definitions

As used herein, "comprising" is to be interpreted as specifying the presence of the stated features, integers, steps, or components as referred to, but does not preclude the presence or addition of one or more features, integers, steps, or components, or groups thereof. Moreover, each of the terms "by", "comprising," "comprises", "comprised of," "including," "includes," "included," "involving," "involves," "involved," and "such as" are used in their open, non-limiting sense and may be used interchangeably. Further, the term "comprising" is intended to include examples and aspects encompassed by the terms "consisting essentially of" and "consisting of." Similarly, the term "consisting essentially of" is intended to include examples encompassed by the term "consisting of.

As used in the specification and the appended claims, the singular forms "a," "an" and "the" include plural referents unless the context clearly dictates otherwise. Thus, for example, reference to "a thermoplastic polymer" includes, but is not limited to, mixtures or systems including two or more such thermoplastic polymers, and the like.

It should be noted that ratios, concentrations, amounts, and other numerical data can be expressed herein in a range format. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. Ranges can be expressed herein as from "about" one particular value, and/or to "about" another particular value. Similarly, when values are expressed as approximations, by use of the antecedent "about," it will be understood that the particular value forms a further aspect. For example, if the value "about 10" is disclosed, then "10" is also disclosed.

When a range is expressed, a further aspect includes from the one particular value and/or to the other particular value. For example, where the stated range includes one or both of the limits, ranges excluding either or both of those included limits are also included in the disclosure, e.g. the phrase "x to y" includes the range from 'x' to 'y' as well as the range greater than 'x' and less than 'y'. The range can also be expressed as an upper limit, e.g. 'about x, y, z, or less' and should be interpreted to include the specific ranges of 'about x', 'about y', and 'about z' as well as the ranges of 'less than x', less than y', and 'less than z'. Likewise, the phrase 'about x, y, z, or greater' should be interpreted to include the specific ranges of 'about x', 'about y', and 'about z' as well as the ranges of 'greater than x', greater than y', and 'greater than z'. In addition, the phrase "about 'x' to 'y'", where 'x' and 'y' are numerical values, includes "about 'x' to about 'y'".

It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a numerical range of "about 0.1% to 5%" should be interpreted to include not only the explicitly recited values of about 0.1% to about 5%, but also include individual values (e.g., about 1%, about 2%, about 3%, and about 4%) and the sub-ranges (e.g., about 0.5% to about 1.1%; about 5% to about 2.4%; about 0.5% to about 3.2%, and about 0.5% to about 4.4%, and other possible sub-ranges) within the indicated range.

As used herein, the terms "about," "approximate," "at or about," and "substantially" mean that the amount or value in question can be the exact value or a value that provides equivalent results or effects as recited in the claims or taught herein. That is, it is understood that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art such that equivalent results or effects are obtained. In some circumstances, the value that provides equivalent results or effects cannot be reasonably determined. In such cases, it is generally understood, as used herein, that "about" and "at or about" mean the nominal value indicated ±10% variation unless otherwise indicated or inferred. In general, an amount, size, formulation, parameter or other quantity or characteristic is "about," "approximate," or "at or about" whether or not expressly stated to be such. It is understood that where "about," "approximate," or "at or about" is used before a quantitative value, the parameter also includes the specific quantitative value itself, unless specifically stated otherwise.

As used herein, the terms "optional" or "optionally" means that the subsequently described event or circumstance can or cannot occur, and that the description includes instances where said event or circumstance occurs and instances where it does not.

As used herein, a "fiber-reinforced composite" or FRC is a material including a continuous matrix phase, an interphase region, and a fibrous discontinuous phase. FRC materials can be used in construction, marine, automotive, and/or aerospace applications. In one aspect, the matrix phase can be a thermosetting material such as, for example, an epoxy, vinyl ester, or polyester thermosetting material. In another aspect, the fibrous discontinuous phase can be composed of a plurality of fibers including glass, aramid, carbon, or other fibers. In some aspects, in the FRC materials disclosed herein, the interphase region can be composed of a thermoplastic material.

In one aspect, the FRC materials disclosed herein include a "thermosetting polymer." In another aspect, a thermosetting polymer or resin is irreversibly hardened upon curing, which can be induced by heat or radiation, as appropriate for the polymer. In one aspect, curing involves the formation of irreversible chemical bonds. Curing can be further promoted by the application of pressure, mixing with a catalyst, or reaction with a curing agent. In one aspect, it is typically possible to manipulate a thermosetting polymer prior to curing, e.g., by molding or pouring, but following curing, a thermosetting polymer cannot be melted and reshaped.

In another aspect, the FRC materials disclosed herein include a "thermoplastic material." As used herein, a thermoplastic material is typically a polymer with a high molecular weight that, at elevated temperature, regains a degree of pliability or moldability. In one aspect, upon cooling, a thermoplastic material re-solidifies.

As used herein, an "amorphous" thermoplastic material lacks a crystalline structure and may be susceptible to chemical degradation or environmental stress cracking, but are easy to thermoform and tend to have good impact resistance. Amorphous thermoplastics tend to have a broad softening range, as well. Meanwhile, a "semi-crystalline" thermoplastic does not fully crystallize below its glass transition temperature, may be difficult to thermoform, and has only average impact resistance. However, in one aspect, semi-crystalline thermoplastics tend to be resistant to chemicals and suitable for structural applications and to have a sharp melting transition.

"Glass transition temperature" or $T_g$, as used herein, is typically a range of temperatures over which the glass-liquid transition in a material occurs. The glass-liquid transition (or glass transition) is a property of amorphous materials and/or semi-crystalline materials having amorphous regions, wherein the material transitions from a brittle or hard state to a viscous state as temperature is increased. $T_g$ is lower than the melting temperature of a material, if the material has a melting temperature.

Meanwhile, the "melting temperature" or $T_m$ of a material is the temperature at which it changes from a solid to a liquid state.

"Glass fiber" is a material made up of thin strands of glass extruded and melt spun into numerous fibers with small enough diameters to be used in textile processing. "E-glass" is a type of glass fiber, originally named because of its electrical (insulator) properties, that is resistant to heat and chemicals and able to maintain its properties over a wide range of conditions. "Glass fiber reinforced polymer" (GFRP) is a material including one or more polymers and glass fibers.

"Carbon fiber reinforced polymer" (CFRP) is a material including one or more polymers and carbon fibers. In one aspect, CFRP materials have high strength and light weights. In another aspect, CFRPs can have high stiffness. In some aspects, the polymers can include a thermoset resin such as, for example, a thermoset epoxy, for a matrix material. In another aspect, the polymers can include a thermoplastic material such as, for example, EMAA, as an interphase material. In one aspect, the composites and composite laminates disclosed herein include carbon fibers as reinforcing materials instead of or in addition to a glass fiber reinforcing material.

"Melt-bonding" as used herein refers to increasing the temperature of a thermoplastic material in contact with a second material such that the thermoplastic material melts and flows to cover the second material or a portion thereof. The temperature is then allowed to decrease, resolidifying the thermoplastic material and forming a bond between the thermoplastic material and the second material. In some aspects, the thermoplastic material while molten can penetrate into pores, cracks, and/or spaces present in the second material and remains present in the pores, cracks, and/or spaces following resolidification. In another aspect, when the thermoplastic material is in contact with two different materials such as, for example, two sheets of E-glass fabric, melt-bonding can adhere the two sheets of E-glass to one another.

"Self-healing" as used herein refers to the process by which a material that has been damaged returns to an undamaged state. In one aspect, self-healing materials exhibit the ability to repair themselves using the resources inherently available to them. In some aspects, the repair process can be autonomous while in other aspects, the repair process can be externally assisted (e.g., by applied heating). In any of these aspects, the recovery process is triggered by damage to the material. In one aspect, the FRCs disclosed herein can be self-healing without the need for external assistance. In one aspect, following self-healing, a material such as, for example, an FRC, returns to a state in which the material's properties are comparable to the properties of the material prior to the occurrence of any damage. In another aspect, following self-healing, the sites of crack or fracture initiation are repaired, as are existing cracks and fractures. In a further aspect, following self-healing, the material can safely be used for its original intended purpose without increased likelihood of failure; for example, an aircraft having a body panel made from or including a self-healing FRC material, wherein the FRC had undergone a self-healing cycle following damage such as, for example, interlaminar delamination, would be suitable for flight without additional repairs. In one aspect, self-healing efficiency (η) can be calculated as the ratio of healed to virgin (new material) critical strain energy release rate and expressed as a percentage. Exemplary methods for performing this calculation are provided in the Examples.

"Interlaminar delamination" is a type of damage that can occur in laminated (layered) composite materials. As used herein, "interlaminar delamination" refers to a discontinuity between two plies or layers of a laminate material. In one aspect, the FRC materials disclosed herein are capable of self-healing interlaminar delamination.

"Resistive heating" (also sometimes referred to as "Joule heating") is the production of heat when an electric current is passed through a conductor. In one aspect, the FRC materials disclosed herein include resistive heating components capable of softening the thermoplastic interphase layer of the FRCs, thus facilitating self-healing of the materials from interlaminar delamination.

When self-healing occurs "in situ," the self-healing process can be accomplished without removing the FRC material from or disassembling components of the structure in which it is installed (e.g., aircraft, watercraft, infrastructure components, and the like). In one aspect, resistive heating components in an FRC can increase the local temperature such that the interphase material melts and flows into areas of damage. Further in this aspect, cessation of heating following melting of the interphase material allows the interphase material to resolidify, thus completing in situ self-healing of the FRC.

The "double cantilever beam fracture test" (also referred to as "DCB test") is a method for characterizing mode-I fracture resistance of composite materials. In some aspects, a composite material is initially partly debonded with a debond length and subjected to symmetrical transverse forces. Delamination is propagated until a set crack length is reached (which is, in some aspects, about 60 mm), at which time the forces are removed. Mode-I critical fracture energy ($G_{IC}$), or strain energy release rate, can then be calculated. Exemplary methods for calculating $G_{IC}$ can be found in the Examples.

A "mode-I fracture" is an "opening" or separation between two layers of a laminate material, or a tensile stress normal to the plane of the layers. "Mode-I fracture resistance" refers to the ability of a composite laminate material to resist this type of damage. In one aspect, the self-healing FRCs disclosed herein exhibit good mode-I fracture resistance even after repeated cycles of self-healing.

"Dynamic mechanical analysis" or DMA is a method by which the $T_g$ of a material can be determined. In one aspect, at the glass transition temperature, storage modulus decreases while loss modulus reaches a maximum. In DMA measurements, an oscillatory strain or stress is applied to a material and the response of the material is monitored based on temperature, frequency of oscillation, or both. In some aspects, a three-point bend test is a method of DMA that can be used to measure $T_g$. Exemplary methods of DMA are discussed further in the Examples.

"Storage modulus" (E') relates to a material's ability to store energy in its elastic structure. Meanwhile, "loss modulus" (E") is a measure of the energy dissipated as heat when a material becomes viscous. In one aspect, DMA measurements can be used to determine E' and E".

"Vacuum assisted resin transfer molding" or VARTM is a process for manufacturing composite materials. In VARTM, the top part of a mold is replaced with a vacuum bag, and vacuum is applied to facilitate resin flow into a fibrous layer. VARTM can be followed by room temperature resin curing, followed by an optional post curing process. An exemplary VARTM setup is described in the Examples.

"Fused deposition modeling" (also referred to as "FDM" or "fused filament fabrication") is a 3D printing process. In FDM, a continuous filament of a thermoplastic material is fed from a spool through a heated printer extruded head, usually in two dimensions, forming one layer of the 3D printed structure at a time.

"Volume fraction" or $V_f$ as used herein refers to the amount of fiber volume in the entire volume of an FRC. In one aspect, $V_f = v_f/v_c$, where $v_f$ is the fiber volume and $v_c$ is the total composite material volume. In a further aspect, $V_f$ is related to mechanical properties of the composite material.

Unless otherwise specified, temperatures referred to herein are based on atmospheric pressure (i.e. one atmosphere).

Self-Healing Composites

In one aspect, disclosed herein is a composite or composite laminate having a matrix material and an interphase material. In some aspects, the matrix material has a glass transition temperature ($T_g$). In other aspects, the matrix material does not have a glass transition temperature. In another aspect, the matrix material can be a thermoset epoxy or similar compound. In still another aspect, the interphase material can be a thermoplastic polymer, a thermoplastic copolymer, or a combination thereof. In one aspect, the interphase material can be polyethylene-co-methacrylic acid (EMAA) or a similar polymer. In one aspect, the interphase material has a melting temperature. Further in this aspect, the $T_g$ of the matrix material can be greater than the melting temperature of the interphase material. In some aspects, the interphase material has a morphology selected from particles, one-dimensional fibers, two-dimensional meshes, two-dimensional films, three-dimensional structures, or a combination thereof.

In some aspects, the interphase material can be 3D-printed via fused deposition modeling (FDM) directly onto a substrate such as, for example, woven E-glass reinforcing plies. In another aspect, a resistive heater can be integrated into the composite stack, providing low-power heating to melt and re-bond the patterned thermoplastic interphase material. In still another aspect, the resulting multifunctional composite exhibits enhanced mode-I interlaminar fracture resistance and provides rapid and repeatable repair with minimal impact on structural performance. In yet another aspect, fabrication steps for the disclosed composites integrate well with existing composite manufacturing methods.

In a further aspect, the composites and composite laminates includes at least one resistive heating component. In some aspects, the resistive heating component can heat the composite to a temperature below the $T_g$ of the matrix material to facilitate self-healing, when the matrix material includes a thermoset polymer or copolymer. In one aspect, when the matrix material does not have a $T_g$, such as, for example, when the matrix material includes a thermoplastic polymer or copolymer having a high melting temperature (e.g., greater than 150° C.), self-healing can be accomplished by heating the composite to a temperature greater than the melting temperature of the interphase material but lower than the temperature of the matrix material. In another aspect, any given portion of the composite is capable of self-healing at least 10 times, at least 20 times, at least 30 times, at least 40 times, at least 50 times, or more than 50 times, or a combination of any of the foregoing values, or a range encompassing any of the foregoing values. In another aspect, no degraded performance is observed after repeated cycles of self-healing of the composite.

Matrix Material

In one aspect, the composites and composite laminates disclosed herein include a matrix material. In a further aspect, the matrix material can be an epoxy matrix. In a further aspect, the matrix material ideally has a high $T_g$ (e.g., above about 150° C.). In another aspect, the matrix material has room temperature infusion and/or solidification capabilities.

In one aspect, the matrix material can be a thermoset resin. In a further aspect, the thermoset resin can be highly crosslinked. In one aspect, any crosslinks formed in the matrix material can be formed by typical polymerization or reaction of functional groups including, but not limited to, epoxy, urethane, imide, cyanate ester, benzoxazine, polyester, vinyl ester, phenol, bismaleimide, amine, acid, hydroxyl, ketone, ether, ester, a salt thereof, or a combination thereof. In some aspects, the amine can be a primary, secondary, or tertiary amine. In one aspect, a highly crosslinked material may be brittle and/or susceptible to microcrack formation within the structure. Further in this aspect, modifying the matrix material with an interphase material can overcome some of the limitations of a thermoset matrix material. In some aspects, the matrix material can include an additional thermoset or curing agent.

In some aspects, the matrix material can be an epoxy such as, for example, a two-part epoxy-amine system. In another aspect, additional additives, cure modifiers, tougheners, and the like, can be added to the epoxy resin prior to curing the resin in order to modify the texture and properties of the resin. In some aspects, a diglycidyl ether of bisphenol A (DGEBA) based epoxy resin can be used, in combination with a hardener such as, for example, or a triethylenetetraamine (TETA) hardener. In a further aspect, the epoxy resin can be an aliphatic epoxy resin such as, for example, a caprolactone based resin, or can be an aromatic based resin, such as, for example, a diglycidyl ether based resin. Suitable DGEBA resins and modifiers include those sold by Huntsman under the trade names ARALDITE® and ARADUR®, such as, for example, ARALDITE® 8605 having a $T_g$ of about 150° C., or ARALDITE® 8615 having a $T_g$ of about 215° C. In one aspect, the cure cycle for the matrix material can consist of a room temperature phase and one or two phases at the same or different elevated temperatures. In a further aspect, a typical cure cycle could be 24 h at room temperature, 2 h at 121° C., and 3 h at 177° C. In another aspect, the modifier and epoxy resin can be present in any ratio such as, for example, 2:1, 1.5:1, 1:1, 1:1.5, or 1:2 of epoxy resin to modifier, such that a thermoset matrix with the desired properties can be achieved. In one aspect, the ratio is 1:1. In some aspects, this ratio of epoxy resin to modifier provides amounts of functional groups such as, for example, tertiary amines, hydroxyls, and carboxylic acids to form volatile byproducts, thereby initiating formation of bubbles, during setting, curing, or post-curing. In a further aspect, the modifier can soften, harden, or otherwise modify the matrix material.

In an alternative aspect, the matrix material can be a thermoplastic polymer or copolymer having a high melting temperature ($T_m$). In one aspect, the melting temperature can be at least 150° C., 175° C., 200° C., 225° C., 250° C., at least 275° C., at least 300° C., at least 325° C., at least 350° C., or greater than 350° C. In one aspect, the thermoplastic polymer or copolymer can be polyphenylene sulfide (PPS), polyether ketone (PEKK), a polyaryl ether ketone (PAEK) polymer, polyether ether ketone (PEEK), or a combination thereof.

In some aspects, the matrix material can be evaluated by a method such as, for example, dynamic mechanical analysis (DMA) for suitability of its properties. In one aspect, DMA can include a 3 point bending test carried out with a 0.01% cyclic strain amplitude at 1 Hz across a temperature range of 25° C-250° C. at a temperature ramp rate of 5° C. per minute according to, for example, the ASTM E-1640 (2013) and ASTM D-7028 (2015) test methods. In a further aspect, DMA can be carried out on a 50×10×2 mm sample (length× width×thickness) with a 40 mm span between the outermost points.

Interphase Material

In another aspect, the composites and composite laminates disclosed herein include an interphase material. In one aspect, the interphase material can be a thermoplastic material. In another aspect, the thermoplastic material can have a melting temperature substantially greater than the curing temperature of the matrix material. In another aspect, the melting temperature of the thermoplastic interphase material can be selected such that it promotes, on post-curing or healing, the flow or movement of the interphase material into any interstitial gaps present in the FRCs disclosed herein. In some aspects, the interphase material and the matrix material can interact via hydrogen bonding, covalent bonding, ionic bonding, van der Waals interactions, dipole-dipole interactions, or another means.

In some aspects, the interphase material can be chemically reactive with the matrix material or a component therein. In another aspect, the interphase material is not chemically reactive with the matrix material. In one aspect, the interphase material can be present as particles, fibers, a film, or any format that facilitates healing of the FRCs disclosed herein. In some aspects, chemical reactivity resulting in covalent bond formation can occur prior to post-curing or healing, or during post-curing or healing.

In one aspect, when the interphase material is chemically reactive with the matrix material, upon heating, the interphase material can flow into a crack or interstitial gap and bond with the surrounding material such as, for example, by hydrogen bonding to adjacent matrix or interphase material. In some aspects, the interphase material has a low viscosity during healing to enhance flow into defects in the FRCs. In a further aspect, the interphase material can, in some instances, be chemically reactive on post-curing or healing. In one aspect, the interphase material can react to release volatile byproducts that increase local pressure and force the interphase material into defects in the FRCs. In one aspect, chemical reactions that generate volatile byproducts include reactions such as, for example, condensation reactions. In another aspect, the condensation reactions can produce water which, at elevated temperatures and/or pressures, is volatile.

In a further aspect, reactivity can be controlled via the selection of functional groups included in the matrix material or the interphase material. In one aspect, the functional groups can be incorporated into the backbone of the matrix material or interphase material, or can be pendant groups attached to the matrix material or interphase material. In another aspect, the functional groups can be amines, carboxylic acids, hydroxyl groups, oxiranes, ketones, ethers, esters, conjugated aromatic compounds, salts thereof, and combinations thereof.

In some aspects, fracture or delamination is sensitive to the properties of the interphase material. In a further aspect, the interphase material can have a maximum healing temperature between about 130 and 150° C., or of about 130, 131, 132, 133, 134, 135, 136, 137, 138, 139, 140, 141, 142, 143, 144, 145, 146, 147, 148, 149, or about 150° C., or a combination of any of the foregoing values, or a range encompassing any of the foregoing values. In one aspect, the maximum healing temperature is less than $T_g$ of the matrix material. In another aspect, the interphase material can function to shorten the composite healing time. In another aspect, the healing temperature of the interphase material can be selected such that the interphase material can flow or move into interstitial gaps, if present, in the FRCs disclosed herein.

In one aspect, the interphase material can be a functionalized polyolefin polymer or copolymer such as, for example, poly(ethylene-co-methacrylic acid) (EMAA) or a similar thermoplastic material. In some aspects, the thermoplastic material can be a thermoplastic elastomer. In another aspect, the functional groups of the thermoplastic polymer can be selected from one or more of the groups including, but not limited to, amine, acid, hydroxyl, epoxy, ketone, ether, ester, and salts thereof. In a further aspect, the acid can be an organic acid or a salt thereof. In a still further aspect, the organic acid can be a carboxylic acid or a salt thereof. In one aspect, the carboxylic acid can be provided by using a polyethylene methacrylic acid as the thermoplastic polymer. In another aspect, other types of acids, different co-polymer ratios, grafting ratios, and/or blends thereof should also be considered disclosed. In one aspect, the thermoplastic polymer can be a functionalized polyolefin or copolymer thereof, or can include a functionalized polyolefin or copolymer thereof. In one aspect, the functionalized polyethylene or copolymer thereof can be polyethylene co-methacrylic acid (EMAA). In another aspect, it is appreciated that the term "functionalized" refers to the polyolefin and polyethylene having functional groups as previously described. It is further appreciated that the polyolefin and polyethylene copolymers can have functional groups as previously described. In another aspect, the interphase material can be a polyolefin such as, for example, a polymer or copolymer including those produced from ethylene monomers, propylene monomers, methylpentene monomers, or 1-polybutylene monomers, and combinations thereof. In another aspect, the interphase material can be selected from polyethylene, polypropylene, polymethylpentene, or poly(ethylene-co-butylene). In some aspects, the interphase material includes a primary polymer and a secondary polymer selected from those disclosed herein.

In another aspect, the interphase material can be selected from polystyrene or polystyrene copolymers such as acrylonitrile butadiene styrene, butadiene styrene (HIPS), styrene acrylonitrile, or other styrene polymer alloys. In still another aspect, the interphase material can be selected from various nylons such as Nylon 6, Nylon 6,6, Nylon 6,12, Nylon 11, and Nylon 12. In another aspect, the interphase material can be selected from polyoxymethylene, poly(ethylene terephthalate), poly(butylene terephthalate), polypropylene, polycarbonate, poly(methyl methacrylate), polyacrylonitrile, poly(vinylidene fluoride), or poly (phenylene sulfide). In another aspect, the interphase material can be selected from poly(lactic acid) or polycaprolactone.

In another aspect, the interphase material, including, but not limited to, EMAA, exhibits healing temperatures between about 130 and 150° C. In another aspect, EMAA exhibits a short thermal dwell of from about 30 to about 60 min, or of about 30, 35, 40, 45, 50, 55, or about 60 min, or a combination of any of the foregoing values, or a range encompassing any of the foregoing values. In another aspect, EMAA can be formulated as particles, fibers, a mesh, or a film, and/or can be 3D printed. In a further aspect, EMAA structures can be modified by a technique such as, for example, laser cutting to impart a structure or pattern. In one aspect, EMAA has a melt mass flow rate of about 400 g/10 min.

In another aspect, many commercial EMAA formulations are suitable for the applications disclosed herein. In one aspect, NUCREL® 2940 sold by DuPont can be used. In a further aspect, NUCREL® 2940 has a methacrylic acid content of about 19% and is supplied in pelletized form. In a still further aspect, this EMAA polymer has an average molecular weight of about 17 kDa and a polydispersity index (PDI) of about 1.7. In another aspect, EMAA formulations with varying methacrylic acid contents and/or metallic salt additives can be used including, but not limited to, NUCREL® 960, SURLYN® 1702, and SURLYN® PC2200 (all from DuPont).

In some aspects, EMAA and/or other polymeric pellets can be pressed between spacers to produce a film. In one aspect, an initial mass of pellets can be pressed between spacers at a particular combination of temperature and pressure. In a further aspect, about 4 g of pellets can be pressed between spacers having a dimension of about 250 µm. In some aspects, pressure can be about 0.22 MPa for an initial stage of processing. In one aspect, the initial stage can be about one hour. Further in this aspect, following the initial stage of processing, pressure can be increased. In one aspect, pressure can be increased to about 2.20 MPa. In some aspects, this second stage of processing can last for about two hours. In another aspect, temperature can be about room temperature for an initial stage of processing. In one aspect, pressure can be increased at a steady rate to a temperature above $T_g$ for the EMAA or other polymeric material such as, for example, about 160° C., or about the melting temperature of the material. In some aspects, temperature can be held at this elevated level for a period of time. In one aspect, the elevated temperature is held for about 10 min. In another aspect, following holding the material at elevated temperature, the temperature of the material is allowed to decrease. In some aspects, the decrease occurs at a steady rate. In other aspects, a heating source is merely removed and the material is allowed to equilibrate at room temperature. In one aspect, cooling can take about 110 minutes. Thus, in any of these aspects, a process for film forming at elevated temperature and/or pressure lasts for about 3 h. In one aspect, following film formation, the film can be patterned. In a further aspect, patterning can be accomplished by any means known in the art including, but not limited to, laser cutting. In one aspect, the film can be about 250 µm in thickness.

Reinforcing Material

In still another aspect, the composites and composite laminates disclosed herein include a reinforcing material. In another aspect, the reinforcing material can be an E-glass such as, for example, FIBREGLAST® 7781 or another E-glass. Further in this aspect, the E-glass can comprise a woven fabric in a plain, twill, harness satin, spread tow, unidirectional, diamond, or hexagonal weave, or can contain multiple weaves in different parts of the fabric. In one aspect, about 14 plies of E-glass can be used. Further in this aspect, the plies can each be about 250 μm in thickness. In an alternative aspect, the fibrous component can be a carbon-based component, a glass, an aramid, an ultra-high molecular weight polyethylene (UHMPE), a basalt fiber, a boron fiber, a silicon carbide fiber, another fiber, or a combination thereof.

In another aspect, the volume fraction ($V_f$) of the E-glass can be about 0.48 in the interphase material. In one aspect, a composite material including an interphase material and an E-glass can have more desirable properties than a non-reinforced interphase material, including, but not limited to, storage modulus (E') across a range of temperatures, from room temperature through the $T_g$ of the interphase material.

In some aspects, the reinforcing material can be or include a carbon fiber. In one aspect, this fiber can be produced from petroleum pitch, coal pitch, or polyacrylonitrile precursors. In one aspect, this carbon fiber can be or include a woven fabric. In another aspect, about 8 plies of this carbon fiber fabric can be used. In another aspect, the fabric can be BGF style 94407 or another type of woven fabric comprising a plain, twill, harness satin, spread tow, unidirectional, diamond, or hexagonal weave. Further in this aspect, the plies can be about 500 μm in thickness.

In one aspect, the reinforcing material can be provided as a sheet or layer. In some aspects, the reinforcing material includes fibrous reinforcement components. In another aspect, the matrix and interphase materials can be provided as sheets and can be used to contact the reinforcing material. In an alternative aspect, the matrix and/or interphase materials can be polymerized in place on or within the reinforcing material.

Resistive Heating Component

In still another aspect, the composites and composite laminates disclosed herein include a resistive heating component. In some aspects, the resistive heating component can include a woven carbon fiber textile, a carbon modified structural fabric, or a combination thereof.

In another aspect, the resistive heating component can be a commercial product such as, for example, POWERFAB-RIC™ from LAMINAHEAT®. In one aspect, two layers of resistive heating component material can be used. Further in this aspect, the resistive heating component material layers can each be about 225 μm thick. In one aspect, the resistive heating component can include copper contacts. In another aspect, the resistive heating component provides uniform heating up to at least 300° C. In some aspects, the resistive heating component can be integrated within fiberglass reinforcement. In still another aspect, the resistive heating component may be damage tolerant due to the presence of dense conductive fibers.

In one aspect, various voltages can be applied to the resistive heating component. In another aspect, the voltage can be from about 1 V to about 400 V, or can be about 1, 25, 50, 75, 100, 125, 150, 175, 200, 225, 250, 275, 300, 325, 350, 375, or about 400 V, or a combination of any of the foregoing values, or a range encompassing any of the foregoing values. In another aspect, the resistive heating component can generate a maximum power of up to about 20 kW/m² when incorporated as part of a composite material, or of about 1, 2, 3, 4, 5, 6, 7, 8, 9, 10, 11, 12, 13, 14, 15, 16, 17, 18, 19, or about 20 kW/m², or a combination of any of the foregoing values, or a range encompassing any of the foregoing values. In still another aspect, the resistive heating component can operate on either a direct current or an alternating current. In still another aspect, the resistive heating component can heat the FRC materials at a rate of about 30° C. per minute. In one aspect, the entire surface of the resistive heating component heats at the same time. In one aspect, the resistive heating component can be less than about 300 μm thick, or less than about 250 μm thick, or less than about 200 μm thick, or less than about 150 μm thick, or less than about 100 μm thick.

In one aspect, the resistive heating component can be part of a film. In another aspect, the film can be a polymeric film such as, for example, ethylene vinyl acetate (EVA), thermoplastic polyurethane (TPU), polyethylene terephthalate—glycol modified (PETG), or another polymer. In another aspect, the film can have a weight of from about 80 to about 300 g/m², or about 80, 90, 100, 110, 120, 130, 140, 150, 160, 170, 180, 190, 200, 210, 220, 230, 240, 250, 260, 270, 280, 290, or about 300 g/m², or a combination of any of the foregoing values, or a range encompassing any of the foregoing values.

In another aspect, the resistive heating component can be perforated or may be essentially continuous. In one aspect, a perforated heating component may exhibit resistance of up to about 40 Ω/m². In an alternative aspect, a continuous or non-perforated heating component may exhibit resistance of up to about 10 Ω/m². In some aspects, the resistive heating component includes a reinforcing fiber matrix such as, for example, glass fiber, polyester, polyamide, cotton, or another fiber.

In still another aspect, the resistive heating component includes one or more heating fibers. In a further aspect, the heating fibers can be carbon fibers, carbon nanotubes, copper or copper alloys, stainless steel, platinum, zinc, manganin, Nichrome (NiCr), Kanthal (FeCrAl), molybdenum disilicide, silicon carbide, quartz, PTC (positive temperature coefficient) ceramic such as, for example, barium titanate or lead titanate, PTC polymer, or a combination thereof, and can be manufactured as strands, twisted or double-twisted filaments, tinsel, conductively plated filaments, etched foil filaments, or a combination thereof. In some aspects, the heating fibers are insulated. In other aspects, the heating fibers are not insulated. In one aspect, the resistive heating component includes a plurality of temperature sensors such that amount of heating can be correlated to the temperature of the FRC in order to maintain the FRC at the optimal temperature for material self-healing.

In one aspect, the resistive heating component can be operated at different power levels corresponding to different temperatures. In a further aspect, a longer healing time may be required for a lower temperature and/or lower power level, while a shorter healing time can be achieved at a higher temperature and/or higher power level.

In any of these aspects, the resistive heating component can include or contact one or more suitable contact, wire, electrode, and/or other conductive material such that power can be supplied to the resistive heating component.

Additional Components

In some aspects, the matrix layer, the interphase layer, or the reinforcing fiber layer can include additional components or additives including, but not limited to, rheology modifiers, fillers, hardeners, thermal stabilizers, UV stabilizers, foaming agents, fire retardants, lubricants, surfactants, and combinations thereof. In one aspect, these additional components can be present in amounts of less than 10% (w/w) of the total layer, component, or composite material.

In one aspect, rheology modifiers can include hydroxypropyl methylcellulose and other semi-synthetic cellulose derivatives, urea or modified urea, a polyhydroxycarboxylic acid amide, or a combination thereof. In some aspects, the additional component can be a film former such as, for example, a dicarboxylic acid ester, a glycol ether, or a combination thereof. In a further aspect, the additional components can be wetting agents including, but not limited to, fluorochemical surfactants, polyether modified polydimethylsiloxane, and combinations thereof. In still another aspect, the surfactant can be a fatty acid derivative, a quaternary ammonium salt, another surfactant, or a combination thereof. In one aspect, the additional component can be a dispersant such as, for example, a primary-alcohol based nonionic surfactant or an alkylphenol-formaldehyde-bisulfide condensate. In another aspect, the additional component can be an anti-corrosion reagent such as a phosphate ester, an alkylammonium salt of (2-benzothiazol-2-ythio) succinic acid, a triazine dithiol, or a combination thereof. In one aspect, the additional component can be a leveling agent such as, for example, a fluorocarbon-modified polymer. In another aspect, the additional component can be an organic or inorganic pigment or due including, but not limited to, fluorescein. In still another aspect, the additional component can be a Lewis acid such as, for example, lithium chloride, zinc chloride, strontium chloride, calcium chloride, ammonium chloride, or a combination thereof. In one aspect, the additional component can be a flame retardant such as a phosphorus derivative selected from a phosphate material, a polyphosphate material, a phosphite material, a phosphazine material, a phosphine material, or a combination thereof (e.g., melamine phosphate, dimelamine phosphate, melamine polyphosphate, ammonium phosphate, ammonium polyphosphate, pentaerythritol phosphate, melamine phosphite, triphenyl phosphine); a nitrogen derivative selected from a melamine, melamine cyanurate, melamine phthalate, melamine phthalimide, melam, melem, melon, melam cyanurate, melem cyanurate, melon cyanurate, hexamethylene tetraamine, imidazole, adenine, guanine, cytosine, thymine, or a combination thereof; a borate material such as, for example, ammonium borate, zinc borate, or a combination thereof; a molecule containing at least two hydroxyl groups such as, for example, pentaerythritol, polyethylene alcohol, a polyglycol, a carbohydrate (e.g., glucose, sucrose, starch), or a combination thereof; a molecule that endothermically releases non-combustible decomposition gases such as a metal hydroxide (e.g., magnesium hydroxide, aluminum hydroxide); expandable graphite, or a combination thereof.

Arrangement of Layers

Figures 7A, 7B:
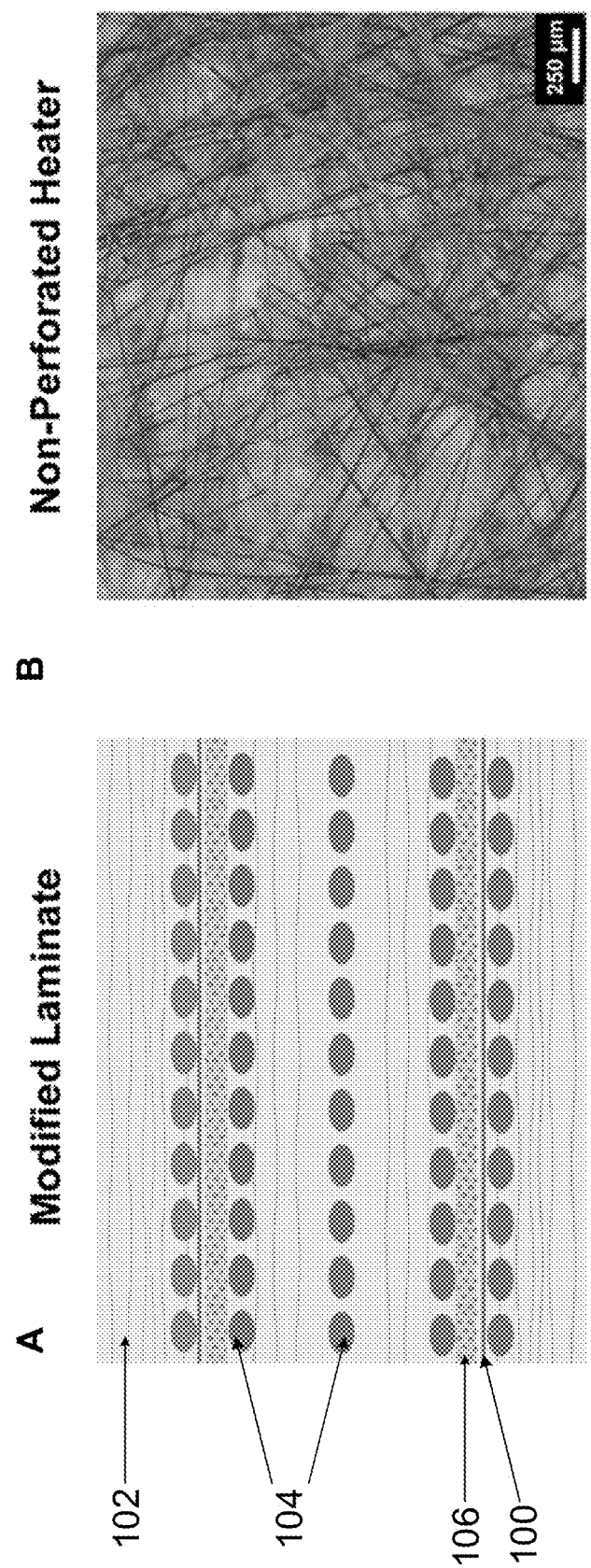
FIG. 7A shows a schematic of an embodiment of refined thermal remending architecture showing printed EMAA interlayers on both sides of the resistive heating component in addition to the original midplane modification.
FIG. 7B shows an optical micrograph of a non-perforated resistive heater reinforcement showing a random network of conductive carbon microfibers.

In one aspect, various arrangements of the elements and components described herein should be considered disclosed. In a further aspect, the composites can include one, two, three, four, five, or more interlayers containing resistive heating elements. In another aspect, the composites can include one, two, three, four, five, or more reinforcing layers containing E-glass fabric, carbon fibers, combinations thereof, and the like. In still another aspect, interphase material and/or matrix material can be present on any face of the resistive heating elements and/or reinforcing layers. Non-limiting examples of arrangements of layers for two exemplary composite laminates are shown in FIGS. 1A and 7A.

Method for Making Self-Healing Composites

In one aspect, disclosed herein is a method for making a self-healing composite, the method comprising contacting at least one substrate with an interphase material to form a first system; contacting the first system with a matrix material; placing at least one resistive heating component in contact with the substrate, the interphase material, the matrix material, or a combination thereof; and solidifying the matrix material.

In one aspect, the substrate is an E-glass fabric, a carbon fiber substrate, or a combination thereof. In another aspect, the thermoplastic polymer or copolymer can be 3D printed on the substrate or can be laser cut from a film and placed on the substrate. In one aspect, the matrix material can be a thermoset epoxy such as, for example, bisphenol A diglycidyl ether-based (DGEBA) or a similar epoxy, having a $T_g$ of about 150° C.

In some aspects, following contacting the at least one substrate with an interphase material to form a first system, the method further includes the step of melt-bonding the interphase material to the at least one substrate. Without wishing to be bound by theory, in one aspect, melt bonding can assist with local incorporation of interphase material domains within neighboring reinforcing layers. In a further aspect, melt bonding can be performed under reduced pressure such as, for example, at about 1 kPa. In another aspect, melt bonding can be performed by increasing the temperature of the first system and optionally holding the laminate at an elevated temperature, followed by cooling. Further in this aspect, the first system can be heated from room temperature to about 110° C. at about 3° C./min. Still further in this aspect, the first system can be held at 110° C. for about an hour to accomplish melt bonding. In one aspect, following holding the first system at elevated temperature, the first system is allowed to cool back to room temperature by natural convection.

In another aspect, the composite material can be fabricated using vacuum assisted resin transfer molding (VARTM). Further in this aspect, a composite preform and ethylene perfluoroether (EPFE) film can be sealed using sealant tape inside a vacuum bag. In another aspect, matrix system EMAA resin and amine hardener can then be pulled through the inlet and can then flow over distribution media including porous peel plies while vacuum is applied to a vacuum outlet. In a further aspect, the matrix material such as, for example, epoxy and amine, can be degassed for a period of up to 3 hours and then infused into a reinforcing fiber panel. In a further aspect, infusion can occur at a reduced pressure such as, for example, 38 Torr. In a still further aspect, the interphase material can be cured for a period of time at reduced pressure. In one aspect, curing can occur for about 24 hours at about 76 Torr. Following curing, in some aspects, a post-curing process can be conducted. In one aspect, post-curing can be in two stages. Further in this aspect, the first stage of post-curing can be conducted at about 121° C. for about 2 h and the second stage of post-curing can be conducted at about 150° C. for about 24 h. In another aspect, the composite material can be fabricated using compression molding, continuous compression molding, resin transfer molding, pultrusion, wet lay-up, prepreg methods, autoclave curing, or a combination thereof.

In one aspect, the aforementioned self-healing composites and composite laminates include embedded sensors and/or materials for self-sensing of damage and the repair (i.e. self-healing) process to enable structural health monitoring. Rather than performing scheduled thermal remending (healing) cycles, such self-sensing functionality would provide a mechanism to trigger the heating/healing and monitor the recovery process in real-time.

Also disclosed are self-healing composites and composite laminates produced by the methods described herein.

Applications of the Composites and Composite Laminates

The FRCs disclosed herein are useful in numerous applications. In one aspect, the FRCs can be used in the automotive industry including vehicle components, aerospace industry including aircraft parts and components, marine industry including watercraft components, and construction industry including bridge pipes and other critical infrastructure components. In another aspect, the FRCs can be used for alternative energy applications such as, for example, to fabricate components of wind turbines, or can be used in athletic equipment such as, for example, skis, skateboards, snowboards, surfboards, and the like.

In one aspect, the FRCs disclosed herein can be used to coat or laminate a metal, another composite material, or a metal-composite material, or can be incorporated as layers of such materials. In one aspect, the metal can include titanium, aluminum, yttrium, zirconium, iron, cobalt, nickel, copper, silver, palladium, platinum, alloys thereof, or other combinations thereof.

Now having described the aspects of the present disclosure, in general, the following Examples describe some additional aspects of the present disclosure. While aspects of the present disclosure are described in connection with the following examples and the corresponding text and figures, there is no intent to limit aspects of the present disclosure to this description. On the contrary, the intent is to cover all alternatives, modifications, and equivalents included within the spirit and scope of the present disclosure.

EXAMPLES

The following examples are put forth so as to provide those of ordinary skill in the art with a complete disclosure and description of how the compounds, compositions, articles, devices and/or methods claimed herein are made and evaluated, and are intended to be purely exemplary of the disclosure and are not intended to limit the scope of what the inventors regard as their disclosure. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

Example 1

Composite Architecture and Determination of Healing Temperature

Figures 2A, 2B:
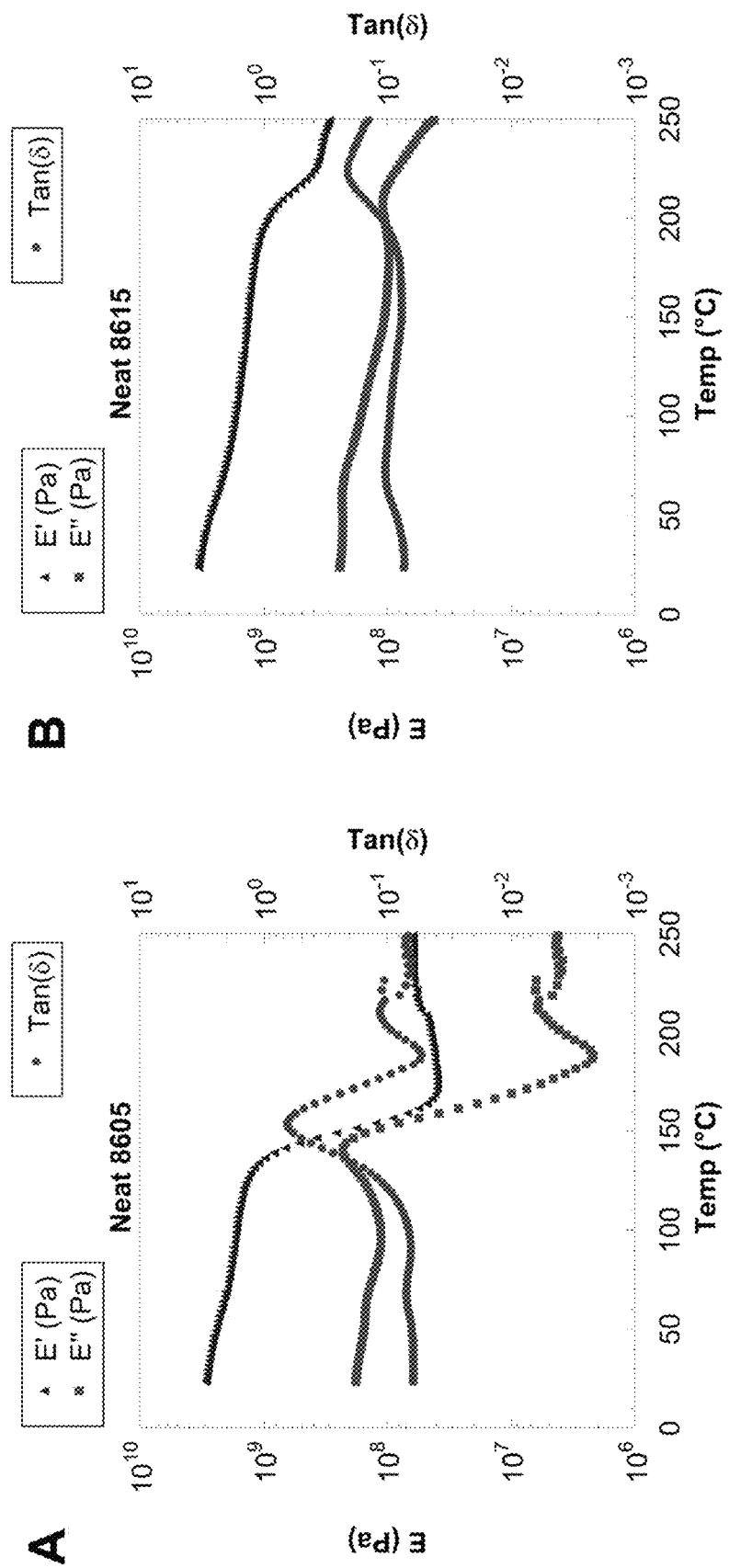
FIGS. 2A-2B show dynamic mechanical analysis (DMA) results for two different neat, bisphenol A diglycidyl ether-based (DGEBA) epoxy 3-point bend samples.
Figures 2C, 2D:
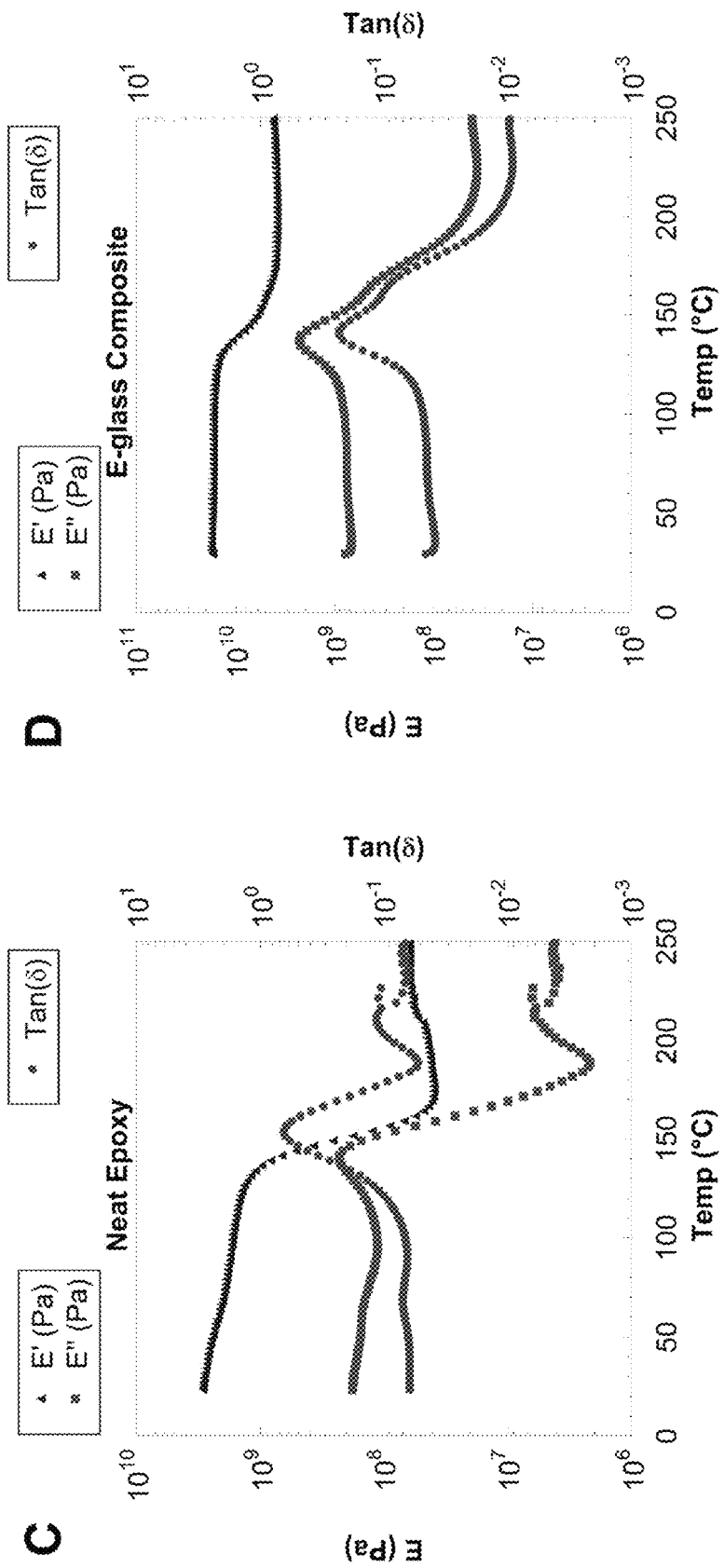
FIGS. 2C-2D show DMA curves for a DGEBA epoxy sample and a DGEBA epoxy-matrix, E-glass fiber-reinforced composite, respectively.

FIG. 1A depicts various components and stacking sequence of our self-healing, laminated fiber composite. A patterned thermoplastic interlayer was produced by 3D printing EMAA 104 directly on a woven (8-harness satin) E-glass fabric 102. Two variations of the serpentine interlayer were printed: 0° (longitudinal) and 90° (transverse) (see FIGS. 1C-1D) to the prescribed crack propagation direction. The patterns were chosen to assess the effect of interlayer orientation on virgin interlaminar fracture resistance and self-healing ability and allowed for precise control of thermoplastic domain shape and dimensions (FIG. 2D). The printed EMAA laminates were roughly 500 µm wide by 250 µm tall where both patterns were printed at areal coverages of 24%, 36%, and 48%. Two proprietary resistive heaters 106 with perforations for enhanced resin flow/bonding and including copper contacts or electrodes 100 were symmetrically placed about the mid-plane. Following 3D printing, local incorporation of the EMAA domains within neighboring reinforcing layers was accomplished via a "melt-bonding" procedure. This was performed under 1 kPa of static pressure at a temperature ramp of 3.0° C./min from room temperature (RT) to a target temperature of 110° C. where the laminate was held for 60 minutes before cooling again to RT via natural convection. The final composite laminate was fabricated at room-temperature via vacuum assisted resin transfer molding (VARTM) using a DGEBA based epoxy system that was post-cured to 150° C. after 24 h. FIG. 1B shows an optical image of a perforated resistive heater interlayer including a plurality of resistive heating components 106. In the exemplary process modeled in FIG. 1A, in step 1Ai (left panel), the initial state of the composite is shown as a modified FRC laminate with resistive heaters placed symmetrically about a mid-ply that is functionalized with 3D printed thermoplastic. In step 1Aii, delamination damage ruptures the EMAA and separates the mid-layers. In step 1Aiii, resistive heating melts the thermoplastic domains, resulting in bond reassociation and self-repair of internal delamination (i.e., thermal remending), thus returning the FRC to the state shown in step 1Ai.

In order to determine the glass transition temperature ($T_g$) of the fully cured epoxy matrix, dynamic mechanical analysis (DMA) was conducted per ASTM E-1640 on 3-point bend specimens. Results for two different epoxy formulations (ARALDITE®/ARADUR® DGEBA-based epoxies from Huntsman sold as ARALDITE® 8605 and ARALDITE® 8615) are shown in FIGS. 2A-2B and summarized in Table 1:

TABLE 1

DMA Results for ARALDITE ® 8605 and 8615 Neat Epoxies

| Epoxy | $T_g$ (tan(δ) peak) | E' (RT) | E' (130° C.) | $K_{IC}$ (MPa · m$^{1/2}$) |
|---|---|---|---|---|
| 8605 | 150° C. | 2.8 GPa | 1.3 GPa (45%)$^a$ | 0.89 ± 0.01 |
| 8615 | 210° C. | 3.3 GPa | 1.6 GPa (47%)$^a$ | 0.45 ± 0.03 |

Percentages in parentheses signify retained dynamic storage modulus relative to value at 23° C.

ARALDITE® 8605 was chosen for further experiments based on these results. FIG. 2C shows that upon reaching the neat epoxy ARALDITE® 8605 $T_g$ around 150° C., i.e. peak of tan(δ), the storage (E') and loss (E") moduli rapidly decrease as matrix material transitions from a glassy to rubbery state. DMA tests conducted on a composite specimen (FIG. 2D) containing woven E-glass reinforcement (volume fraction $V_f$~48%) show a similar $T_g$ since this is a polymer matrix-dominated property, however the reductions in moduli are not as drastic owing to the fiber-reinforcement (Table 2). A thermal remending temperature of 130° C. (below $T_g$) was ultimately selected, which is higher than the 92° C. melting point of EMAA and which provides a balance between retention of dynamic storage modulus (approximately 90%) and ability to provide sufficient thermal energy for in situ melt/flow and bond re-association for the patterned EMAA.

Figure 2E:
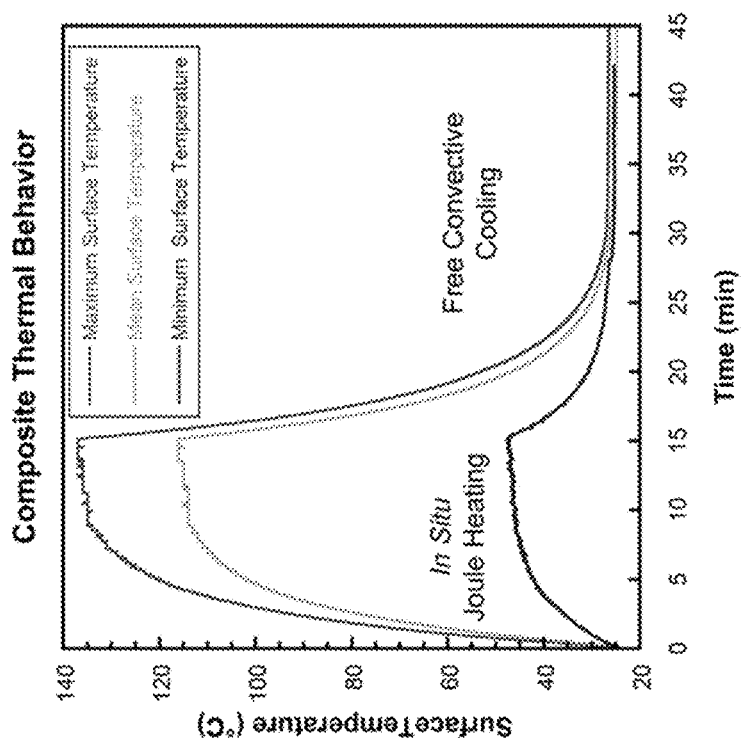
FIG. 2E shows maximum surface temperature and contours for the E-glass composite sample of FIG. 2D versus supplied DC electrical power.
Figure 2F:
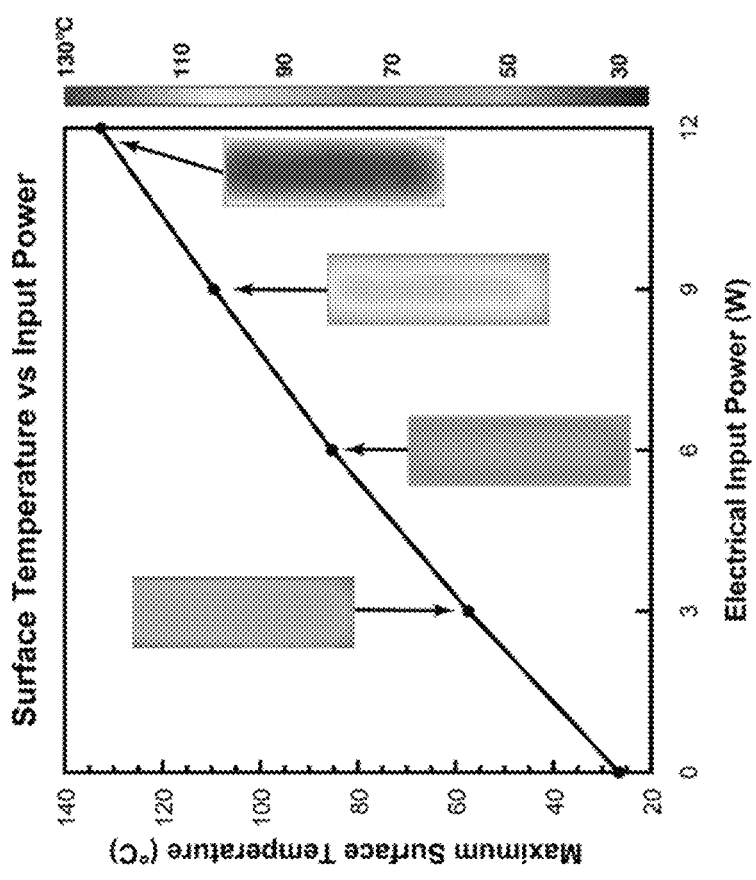
FIG. 2F shows transient, in situ thermal (heating/cooling) response for a composite specimen monitored by an overhead infrared (IR) camera.

FIG. 2E shows the maximum, steady-state surface temperatures and thermal contours versus input power obtained from a composite with integrated resistive heaters and free convective boundary conditions. A nearly uniform surface temperature distribution with a corresponding maximum temperature of ~130° C. is attained with 12 W of DC power input (<0.6A) on account of the >99% energy conversion efficiency of the resistive interlayers. FIG. 2F depicts the transient heating-cooling response of the multifunctional composite, showing that the target temperature for healing reaches steady state within 15 minutes and the laminate cools back to room temperature within 30 minutes of free convection. Thus a complete heat/cool heal cycle can be accomplished in under one hour.

TABLE 2

Storage Modulus (E') Summary from Dynamic Mechanical Analysis Results

| Material | E' (23° C.) | E' (130° C.) | E' $T_g$ (~150° C.) |
|---|---|---|---|
| Neat Epoxy | 2.8 GPa | 1.3 GPa (45%)$^a$ | 0.1 GPa (4%)$^a$ |
| E-Glass Composite | 17.7 GPa | 15.6 GPa (89%)$^a$ | 11.2 GPa (64%)$^a$ |

Percentages in parentheses signify retained dynamic storage modulus relative to value at 23° C.

Example 2

Effect of Self-Healing Modifications on In-Plane Tensile Properties

Figure 3A:
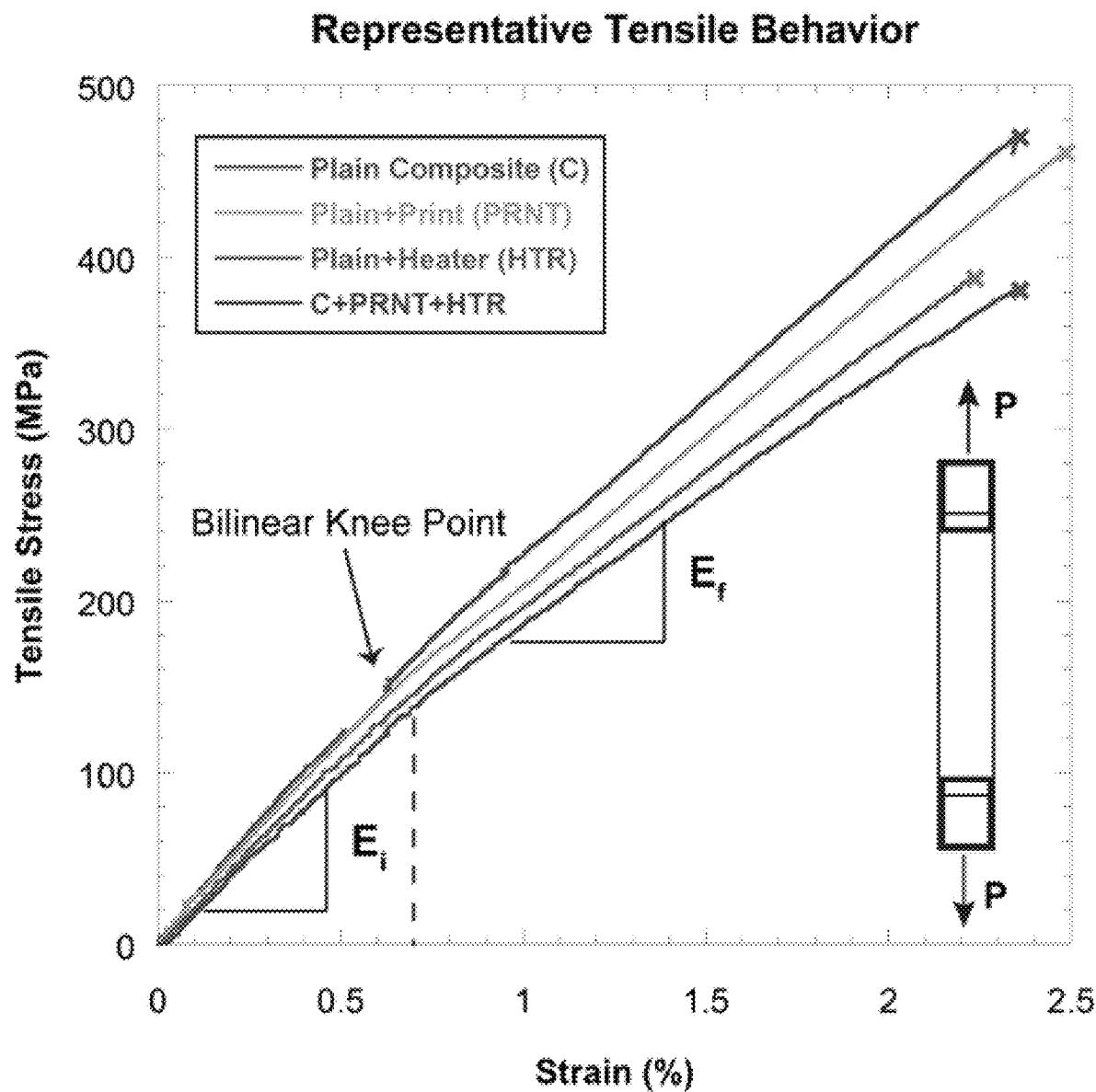
FIG. 3A shows representative stress-strain curves for a plain composite (C), plain composite with two resistive heaters (HTR), a self-healing composite with an EMAA interlayer (PRNT); and a self-healing composite with resistive heaters and an EMAA interlayer (C+PRNT+HTR) in the traverse orientation at 48% areal coverage. The common knee point in the bilinear stress-strain curves is due to matrix micro-cracking where respective moduli for each of the linear regions (initial/final) are shown.

The effects of laminate modifications on in-plane tensile properties were investigated to ensure the structural performance of the composite was not significantly affected by imbuement of self-healing functionality. Tension testing was conducted according to ASTM D-3039 on three types of specimens: (1) a plain composite laminate without modifications; (2) a composite with 3D printed EMAA interphase layer; (3) a composite with two woven E-glass plies replaced by resistive heaters of similar thickness (~250 μm), and (4) a self-healing composite containing both resistive heaters and a printed EMAA interlayer at 48% areal coverage in the transverse orientation. FIG. 3A shows representative uniaxial stress-strain curves for each of the sample types.

Figure 3B:
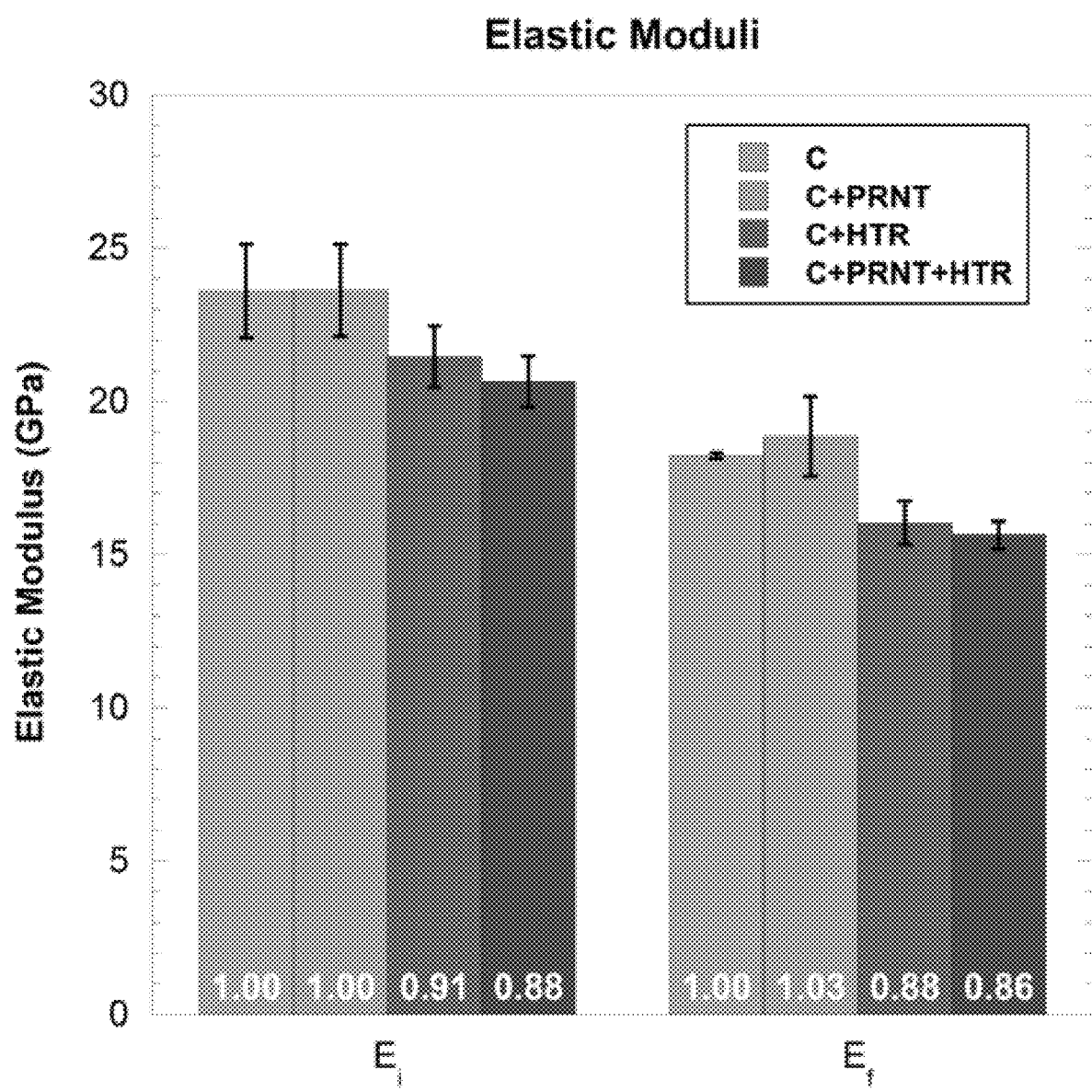
FIG. 3B shows bilinear elastic moduli ($E_{initial}$, $E_{final}$) for the composites, with normalized values shown at the bottom.
Figure 3C:
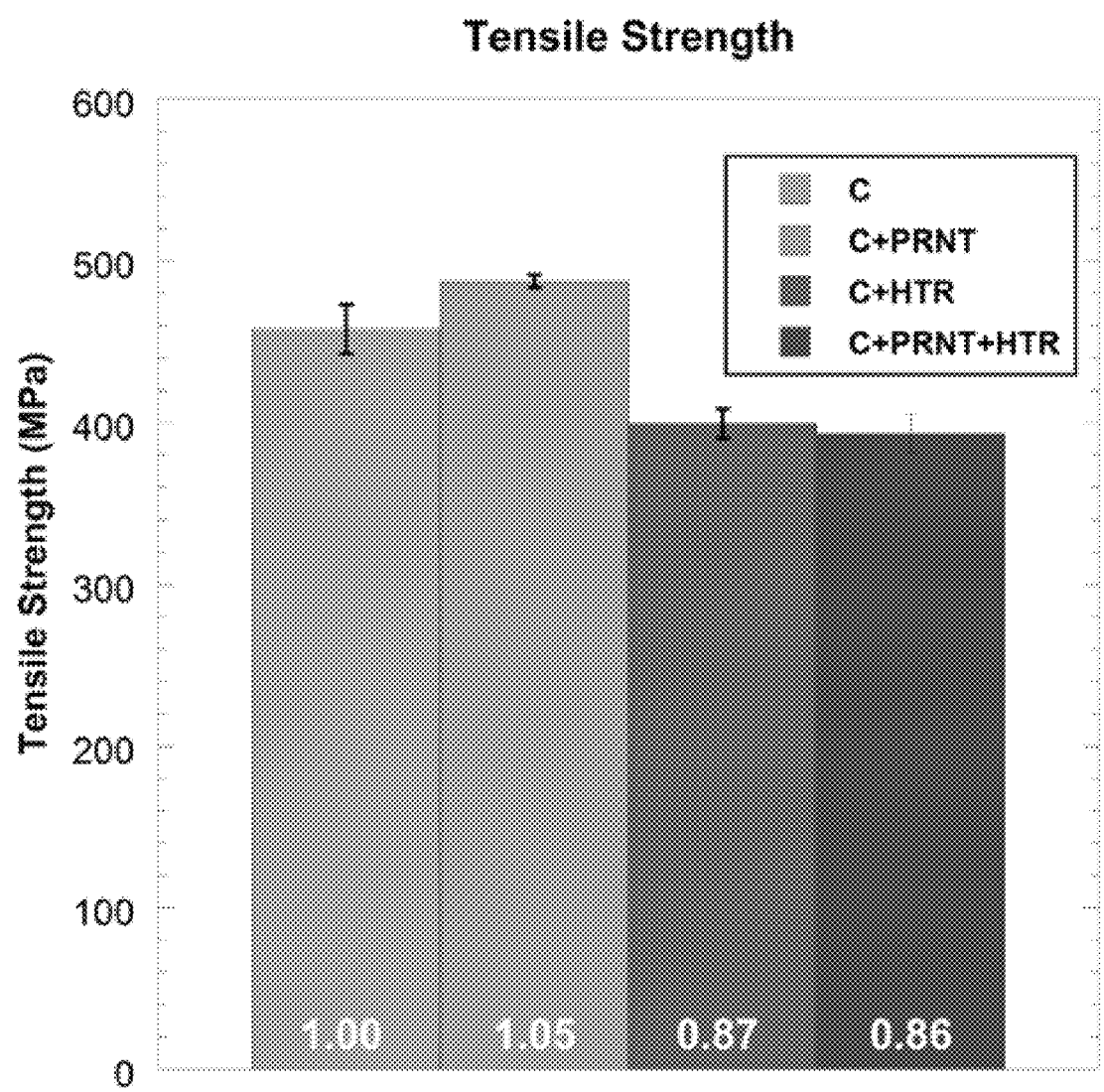
FIG. 3C shows ultimate tensile strength for all composite architectures. Error bars represent standard deviation from three samples tested for each configuration.

As shown in FIGS. 3B-3C, the addition of the EMAA mid-layer to the plain composite laminate results in a negligible difference in elastic modulus and minor increase in ultimate tensile strength, presumably the latter effect due to interlaminar toughening and mitigated delamination damage at/near failure. The primary contributor to in-plane mechanical property reduction is the addition of the perforated resistive heaters, which resulted in an average 9/12% reduction in initial/final elastic modulus respectively and a 13% reduction in ultimate tensile strength compared to the plain, unmodified composite. Addition of an EMAA interlayer along with resistive heaters resulted in a minimal (1-2%) further reduction, confirming the 3D printed thermoplastic has negligible effect on the in-plane properties. Thus, a practical trade-off for in-plane structural integrity is expected for acquisition of interlaminar self-healing functionality.

Example 3

Properties of Composite Laminates

Following vacuum assisted resin transfer molding (VARTM), resistance of the resistive heating components decreases due to the compaction of conductive particles. In general, the wired connection in the composite material is equivalent to two resistors in parallel. Resistance of various laminate configurations is provided in Table 3:

TABLE 3

Resistance of Laminate Layers

| Resistive Layer | Pre-VARTM R (Ω) | Post-VARTM R (Ω) | Wired Connection Single R (Ω) | Wired Connection Parallel R (Ω) |
|---|---|---|---|---|
| 1 | 355 | 144.4 | 144.7 | 75.7 |
| 7 | 442.1 | 157.9 | 158.4 | — |
| 2 | 368.3 | 146.6 | 142.6 | 67.9 |
| 8 | 313.9 | 125.7 | 122.7 | — |

Example 4

Self-Healing of Interlaminar Delamination

In situ recovery of interlaminar fracture resistance was assessed using a mode-I, double cantilevered beam (DCB) fracture geometry. Quasi-static, displacement-controlled loading was applied at 5 mm/min to initiate fracture from a pre-crack of a specified length $a_0$. Delamination propagation ensues along the midplane and continues until a prescribed incremental crack length of $\Delta a=60$ mm is reached. The sample is then unloaded and restored to its undeformed configuration at zero crosshead displacement (δ). Mode-I critical fracture energy ($G_{IC}$), i.e. strain energy release rate, is calculated according to Equation 1:

$$G_I = \frac{\Delta U}{b \Delta a} \quad \text{(Equation 1)}$$

where the internal strain energy $\Delta U$ is calculated by Equation 2:

$$\Delta U = \int_0^\delta P d\delta \big|_a \quad \text{(Equation 2)}$$

where P is the resulting force and b is sample width.

Figure 4A:
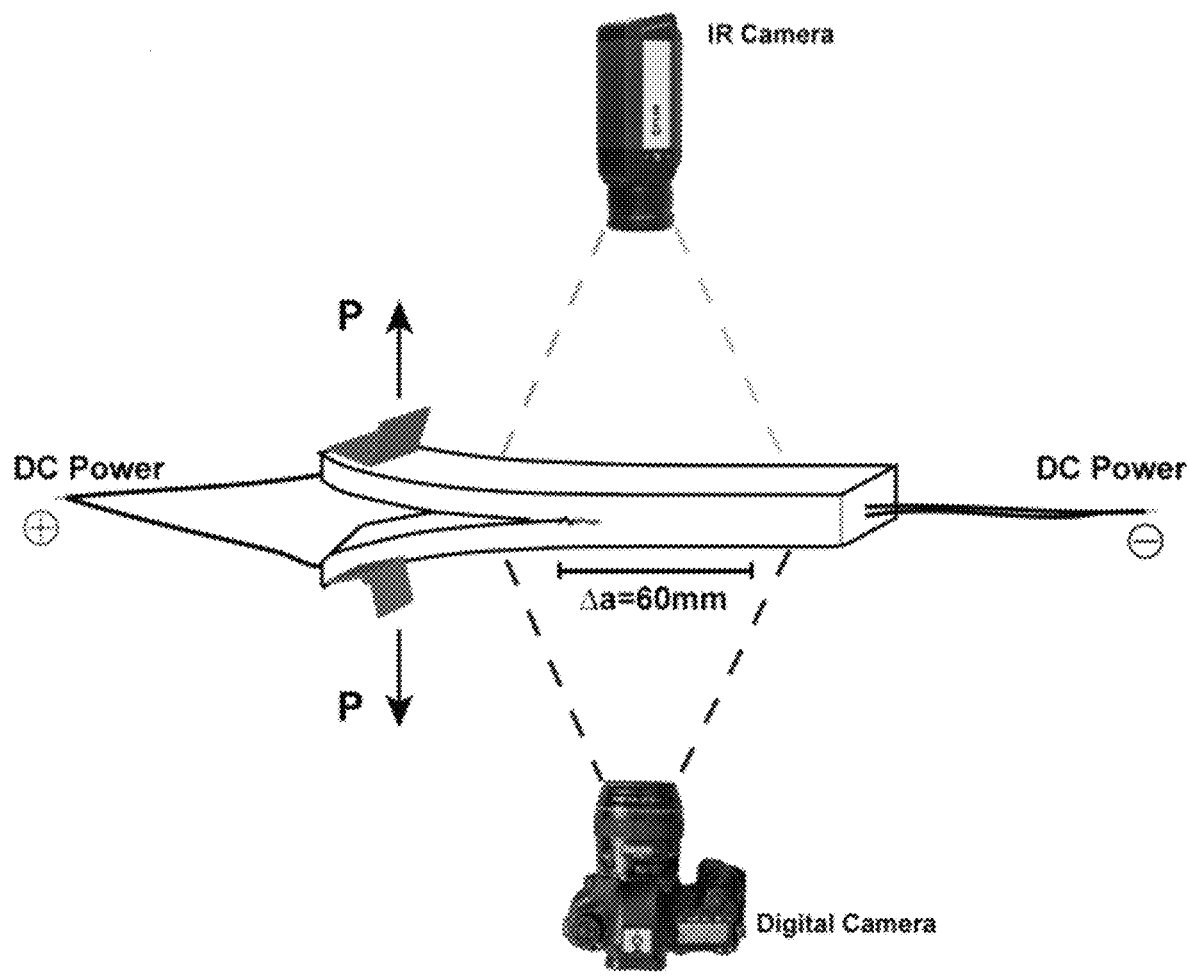
FIG. 4A shows the experimental test setup for in situ self-healing of a fiber-reinforced composite double cantilever beam (DCB) specimen.
Figure 4B:
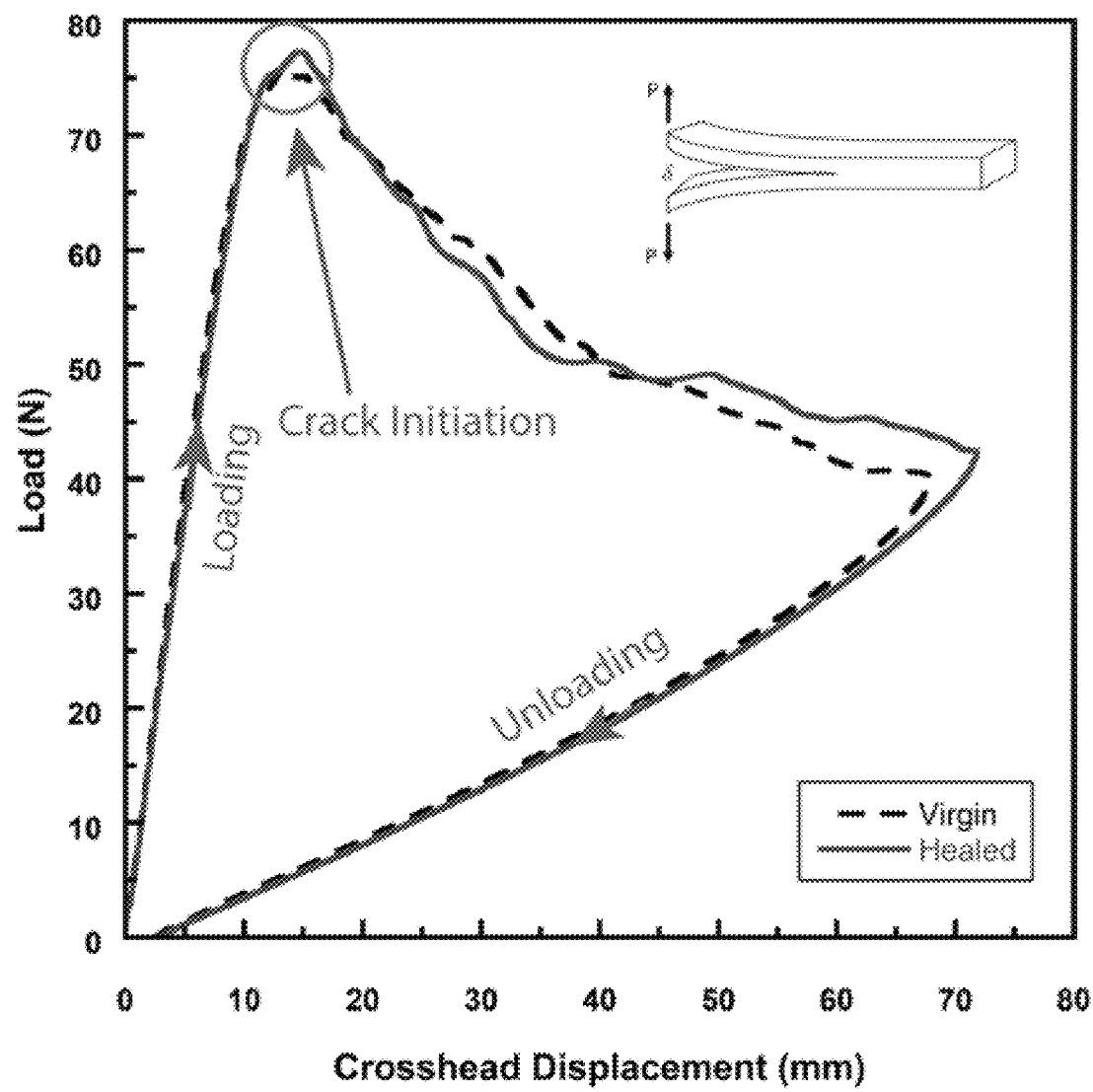
FIG. 4B shows representative load versus displacement behavior for a virgin and healed DCB sample.
Figure 4C:
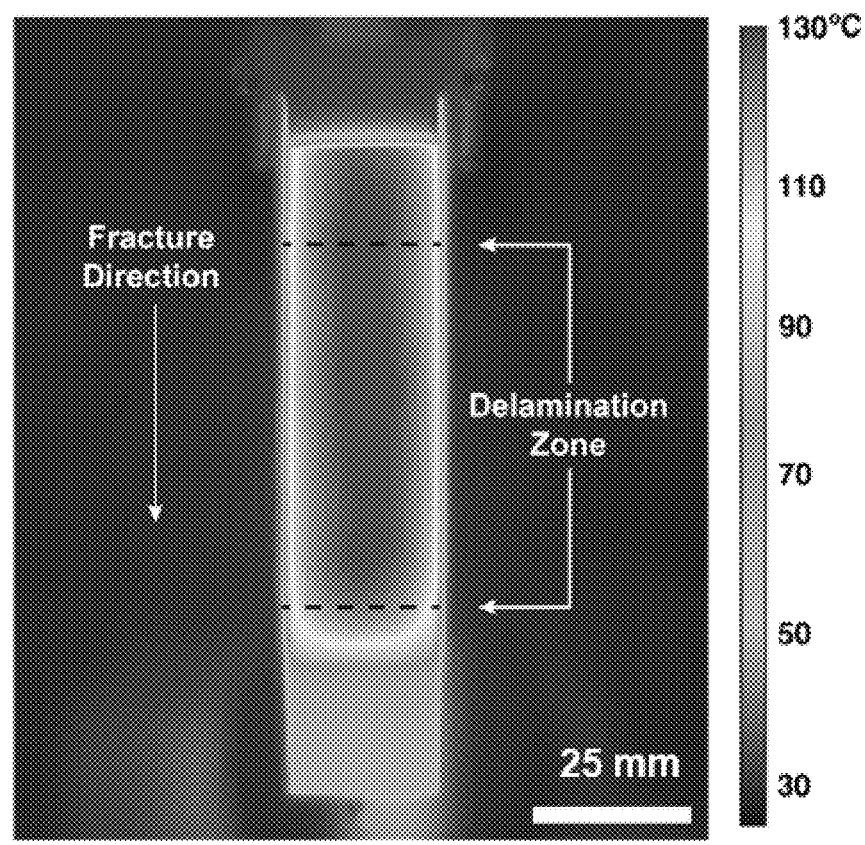
FIG. 4C shows a top surface, steady-state temperature profile during in situ heating within load frame.

FIG. 4A shows the experimental setup for the DCB test. FIG. 4B shows the representative load-displacement behavior during "virgin" fracture and subsequent re-testing after healing according to the same loading procedure. In situ self-healing (i.e. within the test-frame) commences once the virgin sample is unloaded via joule/resistive heating of the delaminated specimen at the target temperature of 130° C. for 15 minutes using 12 W of electrical power. During this thermal remending phase, the top surface temperature is monitored with an infrared (IR) camera (FIG. 4C). The sample is then air cooled for 30 minutes via natural convection before the next test cycle commences. Healing efficiency is calculated as the ratio of healed to virgin critical strain energy release rate and expressed as a percent using Equation 3:

$$\eta = \frac{G_{IC}^{healed}}{G_{IC}^{virgin}} \times 100\% \quad \text{(Equation 3)}$$

where η is the "healing efficiency", and $G_{IC}^{healed}$ and $G_{IC}^{virgin}$ are the healed and virgin critical strain energy release rates, respectively.

Load displacement behavior during fracture for virgin material and 10 healing cycles was assessed. η and $G_i$ results for the virgin material and 10 different healing cycles are presented in Table 4:

TABLE 4

Representative Healing Results

| Test | $G_I$ (J\m$^2$) | η (%) |
|---|---|---|
| V | 912.65 | N/A |
| H1 | 918.90 | 100.69 |
| H2 | 1051.26 | 115.19 |
| H3 | 1125.61 | 123.33 |
| H4 | 1155.20 | 126.58 |
| H5 | 1192.78 | 130.69 |
| H6 | 1063.76 | 116.56 |
| H7 | 1194.02 | 130.83 |
| H8 | 1227.22 | 134.47 |
| H9 | 1115.71 | 122.25 |
| H10 | 1170.60 | 128.26 |

Figures 5A, 5B:
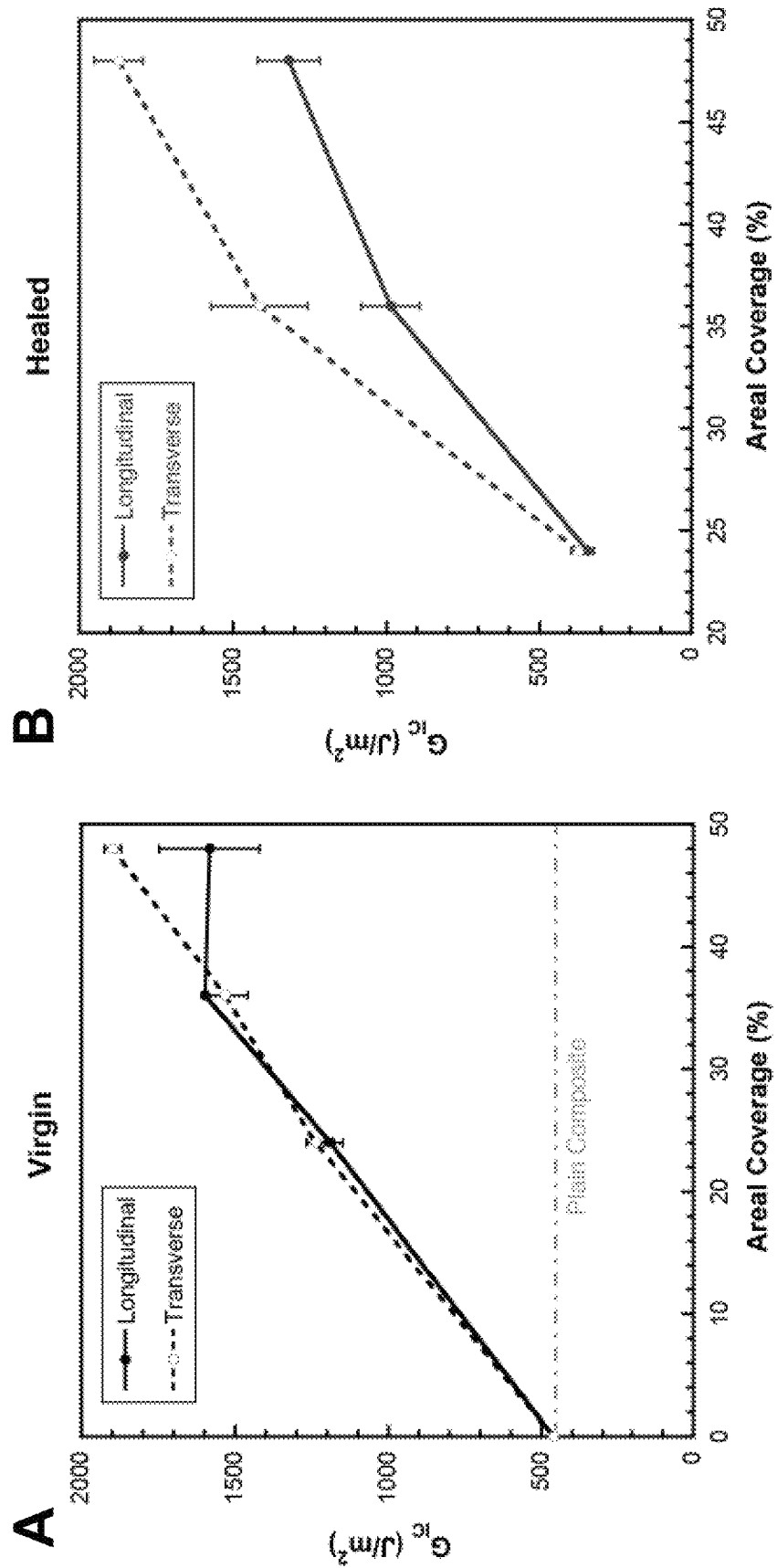
FIGS. 5A-5B show DCB fracture testing results.

In addition to providing recovery of interlaminar delamination damage, the 3D printed EMAA patterns also increase virgin mode-I fracture resistance ($G_{IC}$) compared to a plain composite as shown in FIG. 5A. The virgin fracture resistance exhibits a nearly linear increase (within experimental error) with increasing areal coverage for both longitudinal and transverse patterns, where the highest 48% coverage results in nearly a 400% improvement over a plain composite (460 J/m$^2$). Adequate adhesive bonding to the composite matrix/reinforcement (enhanced via the melt-bonding fabrication step) results in cohesive failure through the tougher EMAA thermoplastic, explaining both the enhanced virgin fracture resistance and nearly linear scaling in $G_{IC}$ with increasing areal coverage.

FIG. 5B shows the effect of both pattern type and areal coverage for the first heal cycle. Similar to virgin GIC enhancement, increasing areal coverage results an approximately linear increase (within error) in healed fracture resistance. However, in contrast to nearly the same virgin $G_{IC}$ for each pattern, the transverse outperforms the longitudinal at higher 36 and 48% coverages, presumably due to crack tip pinning from the discrete elements encountered during fracture propagation.

Figure 6D:
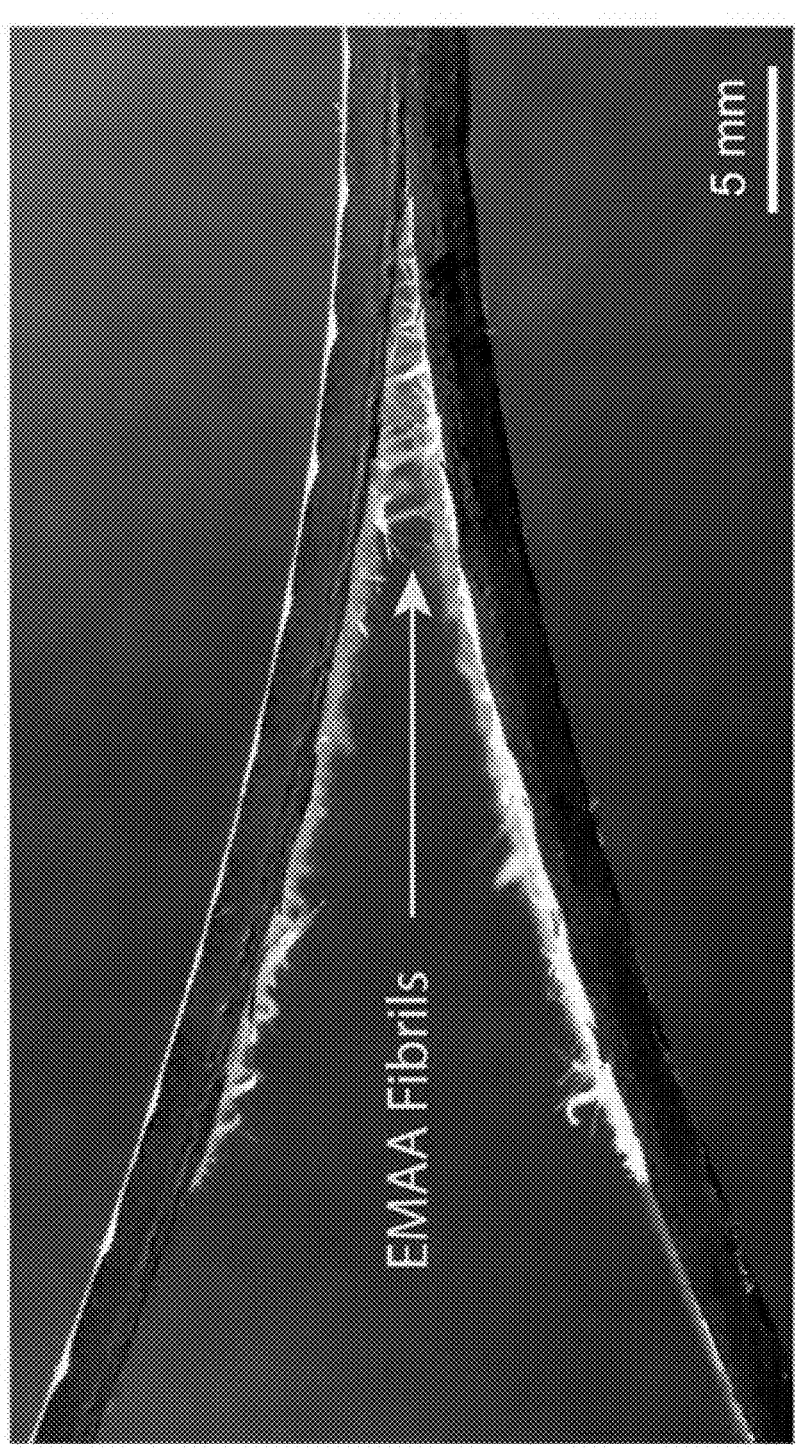
FIG. 6D shows an optical image of EMAA fibrils spanning the DCB crack opening during mode I fracture showing EMAA spreading and increased coverage of underlying woven fiber reinforcement. Error bars represent standard deviation from three samples tested for each configuration.

FIG. 6A summarizes healing efficiencies for all sample configurations after five in situ cycles. Nearly 100% healing efficiency, i.e. complete recovery in crack growth resistance, is achieved with the highest 48% areal coverage for the transverse pattern. It is important to note that healing efficiency is a function of virgin $G_{IC}$ (Equation 3), and thus this nearly complete recovery is with respect to an already 400% increase in virgin strain energy release rate over a plain composite (FIG. 5A). This toughening behavior is largely attributed to the cohesive failure of the EMAA, captured in FIG. 6D (along with glass fiber bridging), which shows plastic deformation and eventual rupture of EMAA fibrils spanning the crack opening within a DCB specimen during the virgin loading cycle.

An increase in healing efficiency was observed over the first few heal cycles for each sample type, after which a plateau value is reached. This can be attributed to more widespread and uniform distribution of EMAA within the fracture plane upon increasing cycle count. FIG. 6B compares a virgin fracture topology showing both EMAA and visible glass fibers that have been ruptured during the delamination process versus a healed fracture surface (FIG. 6C) with EMAA coating a greater portion of the underlying woven fiber mat. This increased distribution of EMAA is attributed to repeated melting and a previously reported pressurized delivery mechanism. As intended, forcing cohesive failure serves to not only enhance, but also maintain fracture resistance through thermoplastic chain re-entanglement and providing a pathway to perpetual, in situ self-healing. An optical image of EMAA fibrils spanning the DCB crack opening during mode I fracture can be seen in FIG. 6D.

Example 5

Towards Perpetual Self-Healing

In several samples tested beyond 5 healing cycles, delaminations outside the intended mid-plane also occurred between the resistive heaters and adjacent reinforcing layers due to the increased interlaminar toughening. The propensity for interlaminar delamination outside the midplane increased with greater EMAA areal coverage. It was observed that this inadvertent delamination originated from the circular perforations in the resistive heaters, which serve as stress-concentrators, and likely also attributed to the reduction of in-plane tensile strength for the composites containing these interlayers (FIGS. 3A-3C). Thus, a modified composite architecture was pursued to enable both virgin toughening and sustained healing. In addition to the 3D printed EMAA at the mid-plane, the refined laminate also employs printed EMAA interlayers adjacent to the resistive heaters as depicted in FIG. 7A. These layers were identical to those printed in the midplane, reflecting a more realistic laminate construction commensurate with end use. Additionally, non-perforated resistive heater reinforcing layers (FIG. 7B) were deployed in this architecture to eliminate the circular stress-concentrators and resulting detrimental effect on strength and interlaminar toughness. Moreover, a 25% thicker EMAA cross-section (500 μm×310 μm) was printed to provide a larger volume of material for maintenance of cohesive failure.

Figure 7C:
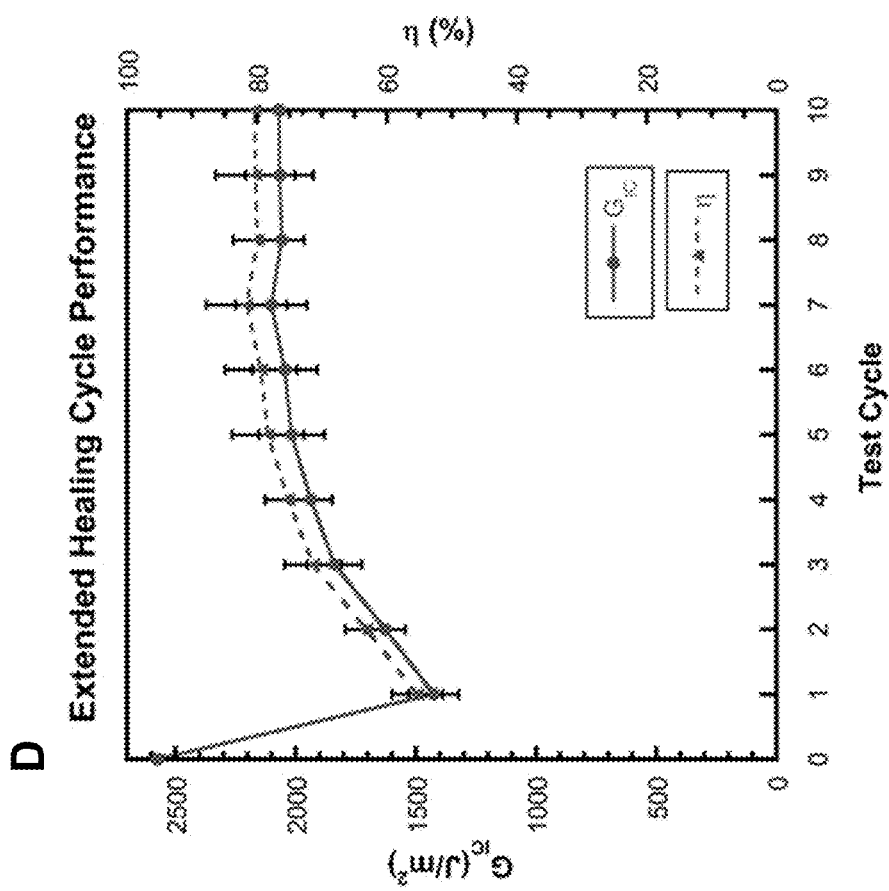
FIG. 7C shows representative load-displacement behavior for an exemplary composite material after 10 healing cycles.
Figure 7D:
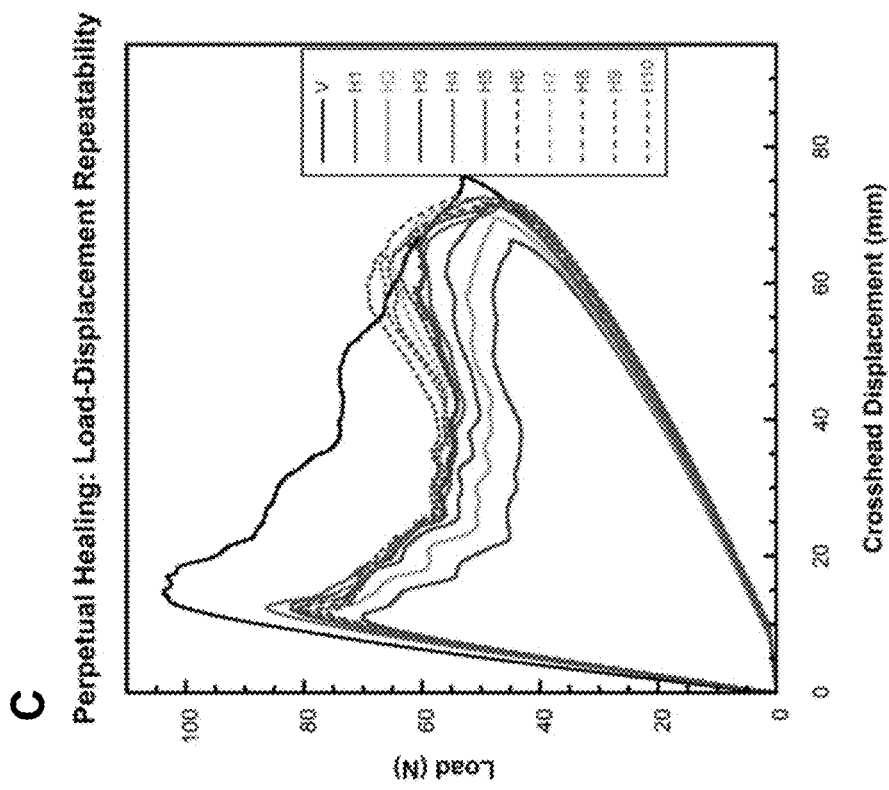
FIG. 7D shows a summary of interlaminar fracture toughness ($G_{IC}$) and healing efficiency (η) in the refined laminate showing characteristic plateau behavior after 5 cycles and sustained in situ healing through 10 cycles. Error bars represent standard deviation from 3 samples tested for each configuration.

FIGS. 7C-7D show the representative DCB load versus displacement behavior and healing performance, respectively, over 10 cycles for three samples containing longitudinal serpentine reinforcing patterns at 36% areal coverage. A clear convergence in healing efficiency after 5 thermal remending cycles confirms the previously observed EMAA spreading effect and increased crack plane coverage. No degradation in thermal behavior and healing performance was observed, indicating the absence of accumulated damage away from the intended midplane fracture. Thus, the system exhibits a high likelihood of achieving perpetual in situ self-healing via thermal remending.

Example 6

Translation of Technology from Glass to Carbon FRP

Figures 8A, 8B:
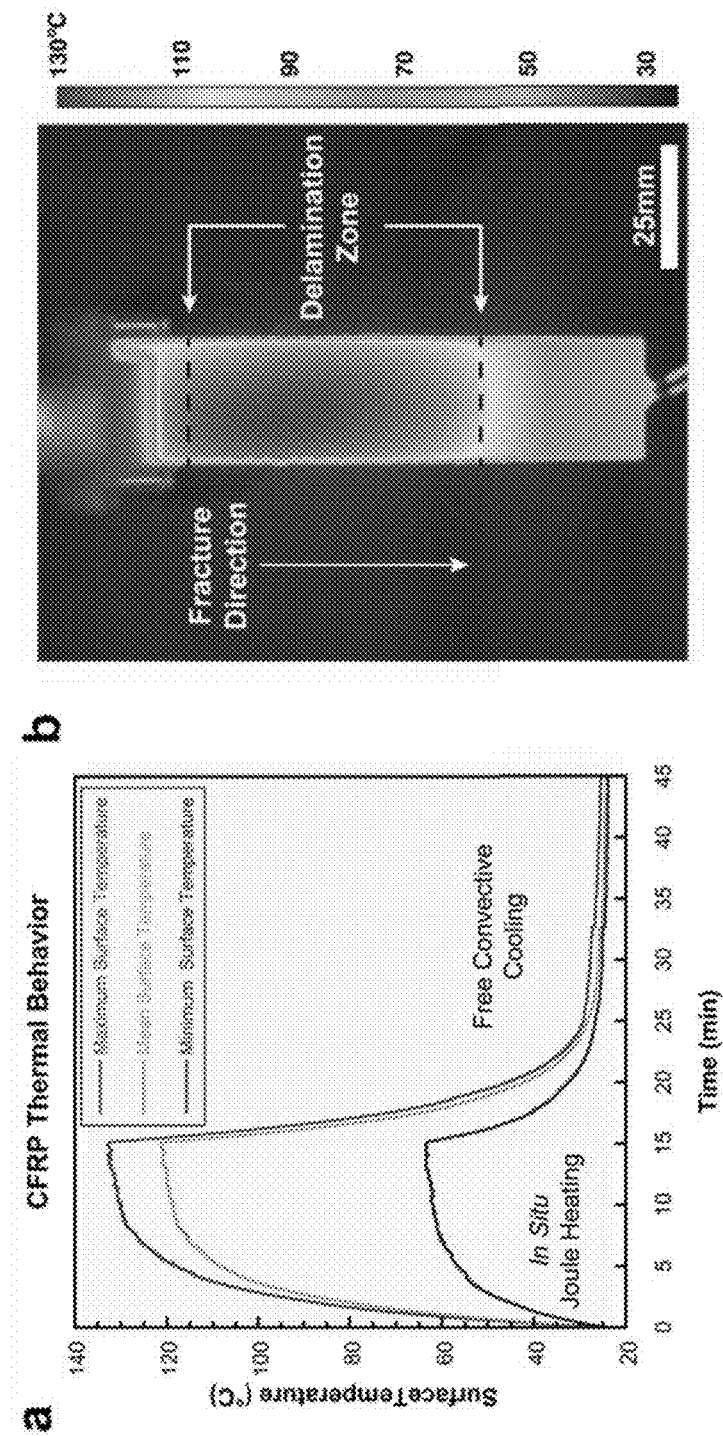
FIG. 8A shows transient, in situ heating/cooling response for carbon fiber-reinforced polymer (CFRP) composite specimen monitored by an overhead infrared (IR) camera.
FIG. 8B shows a top surface, steady-state temperature profile during in situ heating within load frame.
Figures 8C, 8D:
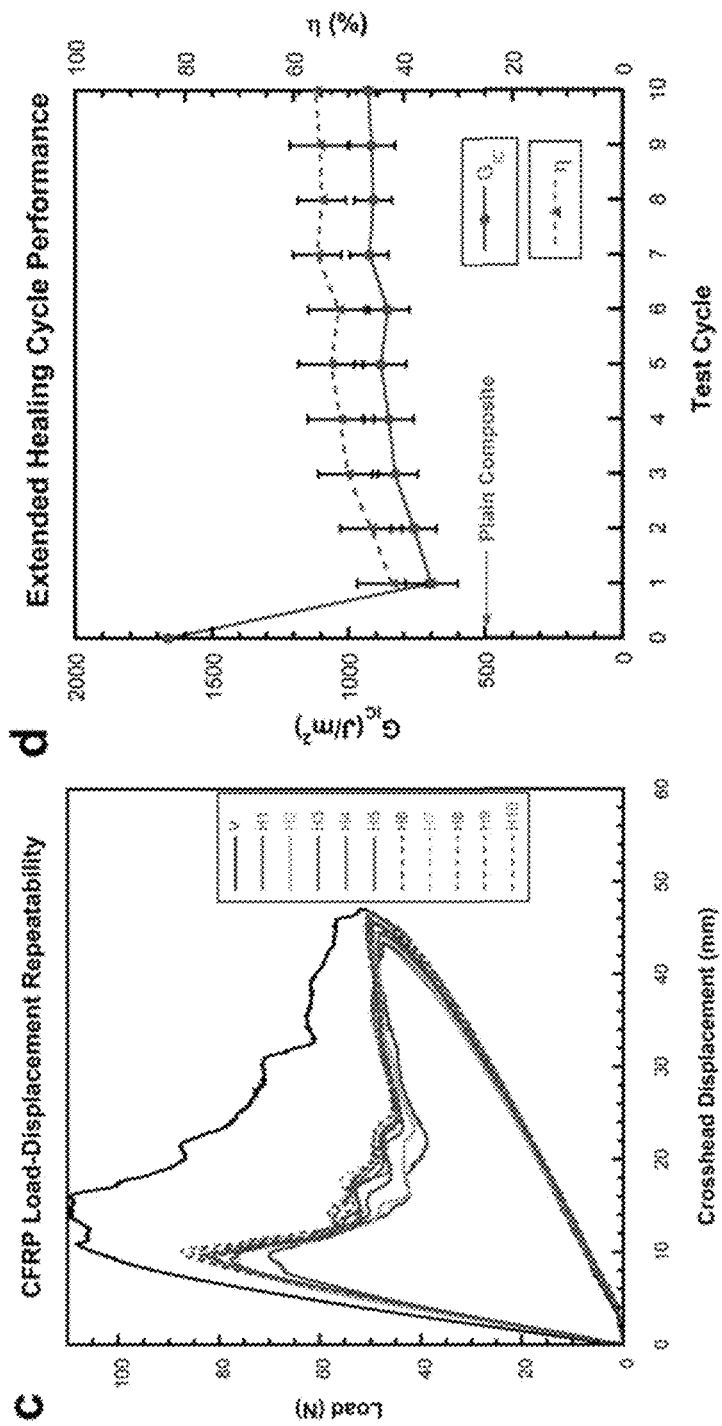
FIG. 8C shows representative load-displacement behavior for virgin and subsequent 10 heal cycles.
FIG. 8D shows a summary of interlaminar fracture toughness ($G_{IC}$) and healing efficiency (η) for the CFRP laminate exhibiting characteristic plateau behavior after 5 cycles and sustained in situ healing throughout testing. Note: Error bars represent standard deviation from three samples tested.

The transition from perforated to non-perforated resistive heaters has also enabled in situ heating via thermal remending in carbon fiber-reinforced polymer (CFRP) laminates. This was particularly challenging as the electrically conductive carbon/graphite reinforcement (in contrast to insulating glass) resulted in an electrical short if the embedded carbon network within the resistive heater interlayer came into contact with the primary reinforcement. Thermal remending in CFRP was accomplished using the laminate architecture shown in FIG. 7A where the woven E-glass plies were replaced with 8H satin carbon fiber. The longitudinal serpentine pattern of EMAA (500 μm×310 μm) was printed at 24% areal coverage. Healing in the CFRP system was achieved using 13 W electrical power input to reach a target temperature of 130° C. for 15 minutes before cooling via natural convection for 30 minutes as illustrated in FIG. 8A. The temperature distribution in FIG. 8B during the heating/healing phase is comparable to the glass fiber-reinforced polymer (GFRP) composite (FIG. 6c). FIGS. 8C-8D show the representative load displacement behavior and extended healing performance, respectively. As with the prior E-glass samples, a plateau in healing efficiency (±2%) after five thermal remending cycles occurs indicating similar EMAA spreading and crack plane coverage. The enhanced toughening in the virgin compared to a plain CFRP composite (325%) scales almost linearly with respect to areal coverage for the increased fracture resistance in GFRP composites at higher 36% coverage. No degradation in heating/healing behavior is observed in the CFRP system after 10 cycles, indicating that the thermal remending system in carbon also has propensity to achieve perpetual healing. This most recent accomplishment greatly expands the importance and commercial applicability of the developed in situ self-healing technology.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

REFERENCES

1. ASTM International, (2017). Standard Test Method for Tensile Properties of Polymer Matrix Composite Materials:D-3039.
2. ASTM International, (2013). Standard Test Method for Mode I Interlaminar Fracture Toughness of Unidirectional Fiber-Reinforced Polymer Matrix Composites: D-5528.
3. ASTM International, (2018). Standard Test Method for Assignment of the Glass Transition Temperature by Dynamic Mechanical Analysis:E-1640.
4. Blaiszik, B. J.et al, (2010). "Self-Healing Polymers and Composites," Annual Review of Materials Research, 40, 179-211.
5. Bodiuzzaman, J. et al, (2020). "Fracture resistance of in-situ healed CFRP composite using thermoplastic healants," Materials Today Communications, 24.
6. Chen, X. et al, (2002). "A Thermally Remendable Cross-Linked Polymeric Material," Science, 295, 1698-1702.
7. Cohades, A. et al, (2018). "Progress in self-healing fiber-reinforced polymer composites," Advanced Materials Interfaces, 5, 1800177.
8. Esser-Kahn, A. P. et al. (2011). "Three Dimensional Microvascular Fiber-Reinforced Composites," Advanced Materials, 23, 3654-3658.
9. Hashemi, S. et al, (1989). "Corrections needed in double-cantilever beam tests for assessing the interlaminar fracture of fibre-composites," Journal of Materials Science Letters, 8, 125-129.
10. Hayes, B. S. et al, (2010). Optical Miscroscopy of Fiber-Reinforced Composites, 1st ed., ASM International.
11. Imato, K. et al, (2012). "Self-Healing of Chemical Gels Cross-Linked by Diarylbibenzofuranone-Based Trigger-Free Dynamic Covalent Bonds at Room Temperature," Angewandte Chemie International Edition, 51, 1138-1142.
12. Kessler, S. S. et al, (2002). "Damage detection in composite materials using frequency response methods," Composites Part B: Engineering, 33, 87-85.
13. Krull, B. et al., (2015). "Automatic Optical Crack Tracking for Double Cantilever Beam Specimens," Experimental Techniques (SEM), 40, 937-945.
14. Meure, S. et al, (2009). "Polyethylene-co-methacrylic acid healing agents for mendable epoxy resins," Acta Materiala, 57, 4312-4320.
15. Meure, S. et al, (2012). "Confirmation of the healing mechanism in a mendable EMAA-epoxy resin," European Polymer Journal, 48, 524-531.
16. Park, J. et al, (2009). "Healing Behavior of a Matrix Crack on a Carbon Fiber/Mendomer Composite," Composite Science and Technology, 69 1082-1087.
17. Patel, A. J. et al, (2010). "Autonomic healing of low-velocity impact in fiber-reinforced composites," Composites Part A: Applied Science and Manufacturing, 41, 360-368.
18. Patrick, J. F. et al, (2014). "Continuous Self-Healing Life Cycle in Vascularized Structural Composites," Advanced Materials, 26, 4302-4308.
19. Patrick, J. F. et al, (2016). "Polymers with autonomous lifecycle control," Nature, 540, 363-370.
20. Pingkarawat, K. et al, (2014). "Healing of fatigue delamination cracks in carbon-epoxy composite using mendable polymer stitching," Journal of Intelligent Material Systems and Structures, 25, 75-86.
21. Pingkarawat, K. et al, (2014). "Mechanical properties of mendable composites containing self-healing thermoplastic agents," Composites Part A: Applied Science and Manufacturing, 65, 10-18.
22. Pingkarawat, K. et al, (2016). "Poly(ethylene-co-methacrylic acid) (EMAA) as an efficient healing agent for high performance epoxy networks using diglyciyl ether of bisphenol A (DGEBA)," Polymer, 92, 153-163.
23. Varley, R. J. et al, (2012). "EMAA as a healing agent for mendable high temperature epoxy amine thermosets," Composites Part A; Applied Science and Manufacturing, 43, 1073-1080.
24. Withers, P. J. et al, (2012). "Fatigue and Damage in Structural materials Studied by X-Ray Tomography," Annual Review of Materials Research, 42, 81-103.
25. Wang, C. H. et al, (2012). "Interlayer self-healing and toughening of carbon fibre/epoxy composites using copolymer films," Composites Part A: Applied Science and Manufacturing, 43, 512-518.
26. White, K. L. et al, (2012). "Delamination toughness of fiber-reinforced composites containing a carbon nanotube/polyamide-12 epoxy thin film interlayer," Polymer, 53, 37-42.
27. Yang, T. et al, (2014). "Mechanical Properties of Self-Healing Carbon Fiber-Epoxy Composite Stitched with Mendable Polymer Fiber," Polymers and Polymer Composites, 22, 329-336.
28. Zhang, Y. et al, (2018) "Toughening Mechanism of Carbon Fibre-Reinforced Polymer Laminates Containing Inkjet-printed Poly(methyl methacrylate) Microphases," Journal of Composite Materials, 52, 1567-1576.

What is claimed is:

1. A self-healing composite comprising:
   a. a matrix material, wherein the matrix material comprises a thermoset polymer or copolymer having a glass transition temperature ($T_g$), a thermoplastic polymer or copolymer having a melting temperature ($T_m$) greater than 150° C., or a combination thereof;
   b. an interphase material, wherein the interphase material has a melting temperature ($T_m$);
   c. an internal resistive heater layer comprising at least one resistive heating component; and
   d. a reinforcing material;
   wherein the at least one resistive heating component heats the composite to a temperature below the glass transition temperature of the thermoset polymer or copolymer of the matrix material or to a temperature below the melting temperature of a thermoplastic polymer or copolymer of the matrix material to facilitate in situ self-healing of the composite; and
   wherein the interphase material is in contact with, and melt bonded to, the reinforcing material.

2. The self-healing composite of claim 1, wherein the glass transition temperature of the thermoset polymer or copolymer is greater than the melting temperature of the interphase material.

3. The self-healing composite of claim 1, wherein the melting temperature of the thermoplastic polymer or copolymer of the matrix material is greater than the melting temperature of the interphase material.

4. The self-healing composite of claim 1, wherein the matrix material comprises a thermoset epoxy, a thermoset vinylester, a thermoset polyester, or a combination thereof.

5. The self-healing composite of claim 1, wherein the matrix material comprises polyphenylene sulfide (PPS), polyether ketone (PEKK), a polyaryl ether ketone (PAEK) polymer, polyether ether ketone (PEEK), or a combination thereof.

6. The self-healing composite of claim 1, wherein the interphase material comprises a thermoplastic polymer, a thermoplastic copolymer, or a combination thereof.

7. The self-healing composite of claim 6, wherein the interphase material comprises polyethylene-co-methacrylic acid, polyethylene, polypropylene, polymethylpentene, poly(ethylene-co-butylene), acrylonitrile butadiene styrene, butadiene styrene (HIPS), styrene acrylonitrile, Nylon 6, Nylon 6,6, Nylon 6,12, Nylon 11, Nylon 12, polyoxymethylene, poly(ethylene terephthalate), poly(butylene terephthalate), polypropylene, polycarbonate, poly(methyl methacrylate), polyacrylonitrile, poly(vinylidene fluoride), poly(phenylene sulfide), poly(lactic acid), polycaprolactone, and combinations thereof.

8. The self-healing composite of claim 1, wherein the interphase material has a morphology comprising particles, one-dimensional fibers, two-dimensional meshes, two-dimensional films, three-dimensional structures, or a combination thereof.

9. The self-healing composite of claim 1, wherein the reinforcing material comprises E-glass, carbon fibers, or a combination thereof.

10. The self-healing composite of claim 1, wherein the composite is capable of in situ self-healing from damage at least 10 times.

11. The self-healing composite of claim 10, wherein the damage comprises interlaminar delamination.

12. A method for making the self-healing composite of claim 1, the method comprising:
    a. contacting at least one reinforcing material with an interphase material and melt-bonding the interphase material to the reinforcing material to form a first system;
    b. contacting the first system with a matrix material;
    c. placing at least one resistive heating component in contact with the reinforcing material, the interphase material, the matrix material, or a combination thereof;
    d. solidifying the matrix material.

13. The method of claim 12, wherein the at least one reinforcing material comprises an E-glass fabric, carbon fibers, or a combination thereof.

14. The method of claim 12, wherein in step (a), the interphase material is 3D printed on the at least one reinforcing material.

15. The method of claim 12, wherein the matrix material comprises a thermoset epoxy, a thermoset vinylester, a thermoset polyester, or a combination thereof.

* * * * *